(12) United States Patent
Rahman et al.

(10) Patent No.: US 12,737,181 B2
(45) **Date of Patent: *Sep. 15, 2026**

(54) MANAGING OPERATIONAL RESILIENCE OF SYSTEM ASSETS USING AN ARTIFICIAL INTELLIGENCE MODEL

(71) Applicant: Citibank, N.A., New York, NY (US)

(72) Inventors: Sofia Rahman, New York, NY (US); Christopher Tucker, London (GB); James Randolph Myers, Clearwater, FL (US); Prashant Praveen, New York, NY (US); Shardul Malviya, London (GB); Wayne Liao, London (GB); Deepak Jain, London (GB); Samantha Cory, London (GB); Mariusz Saternus, Cracow (PL); Daniel Lewandowski, Cracow (PL); Biraj Krushna Rath, London (GB); Stuart Murray, London (GB); Philip Davies, London (GB); Payal Jain, London (GB); Tariq Husayn Maonah, London (GB); Vishal Mysore, Mississauga (CA); Ramkumar Ayyadurai, Jersey City, NJ (US); Chamindra Desilva, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/420,652

(22) Filed: Dec. 15, 2025

(65) Prior Publication Data

US 2026/0104891 A1 Apr. 16, 2026

Related U.S. Application Data

(63) Continuation of application No. 18/935,417, filed on Nov. 1, 2024, now Pat. No. 12,517,724, which is a (Continued)

(51) Int. Cl.
*G06F 8/75* (2018.01)

(52) U.S. Cl.
CPC .................................... *G06F 8/75* (2013.01)

(58) Field of Classification Search
None
See application file for complete search history.

(56) References Cited

U.S. PATENT DOCUMENTS

| | | | |
|---|---|---|---|
| 11,106,801 | B1 | 8/2021 | Levine et al. |
| 11,227,047 | B1 | 1/2022 | Vashisht et al. |

(Continued)

OTHER PUBLICATIONS

Empower Your Team with a Compliance Co-Pilot, Sedric, retrieved on Sep. 25, 2024. https://www.sedric.ai/.

(Continued)

*Primary Examiner* — Alan Chen
(74) *Attorney, Agent, or Firm* — Ashurst Perkins Coie US LLP

(57) ABSTRACT

The systems and methods disclosed herein receives, from a computing device, operational data indicating software or hardware assets used on informational assets, and obtains set of alphanumeric characters defining operative boundaries for expected system assets, which include a set of common attributes. Using the set of attributes, a first set of AI models determines observed system assets from the operational data, each with specific features. A second set of AI models associates each information asset with the corresponding observed system assets. For each observed system asset, a third set of AI models identifies criteria within the alphanumeric characters, compares the criteria with the asset's features to identify gaps, and generates actions to ensure the observed system asset meets the identified criteria.

20 Claims, 18 Drawing Sheets

Related U.S. Application Data continuation-in-part of application No. 18/889,371, filed on Sep. 18, 2024, now Pat. No. 12,346,820, and a continuation-in-part of application No. 18/782,019, filed on Jul. 23, 2024, now Pat. No. 12,197,859, which is a continuation-in-part of application No. 18/771,876, filed on Jul. 12, 2024, now Pat. No. 12,204,323, said application No. 18/661,532 is a continuation-in-part of application No. 18/661,519, filed on May 10, 2024, now Pat. No. 12,106,205, said application No. 18/771,876 is a continuation-in-part of application No. 18/661,532, filed on May 10, 2024, now Pat. No. 12,111,747, said application No. 18/889,371 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,532 is a continuation-in-part of application No. 18/633,293, filed on Apr. 11, 2024, now Pat. No. 12,147,513.

(56) References Cited

U.S. PATENT DOCUMENTS 11,907,860 B2 * 2/2024 Kabra ..................... G06N 5/04
12,505,352 B2 * 12/2025 Rahman ............... G06N 3/0895
2023/0009999 A1 1/2023 Higuchi et al.
2023/0359789 A1 11/2023 Andre et al.
2024/0202351 A1 * 6/2024 Mohammed ........ G06F 21/6218

OTHER PUBLICATIONS

Agarwal et al., How generative AI can help banks manage risk and compliance, McKinsey & Company, Mar. 2024; Total Pages: 8 (Year: 2024).

Kim et al., From RAG to QA-RAG: Integrating Generative AI for Pharmaceutical Regulatory Compliance Process, arXiv:2402.01717v1 [cs.CL] Jan. 26, 2024; Total Pages: 9 (Year: 2024).

Lai et al., Towards a Science of Human-AI Decision Making: A Survey of Empirical Studies, arXiv:2112.11471v1 [cs.AI] Dec. 21, 2021; Total Pages: 36 (Year: 2021).

Mathews, A. W., "What AI Can Do in Healthcare—and What It Should Never Do," The Wall Street Journal, published on Aug. 21, 2024, retrieved on Sep. 5, 2024 https://www.wsj.com.

Schick et al., Toolformer: Language Models Can Teach Themselves to Use Tools, 37th Conference on Neural Information Processing Systems (NeurIPS 2023); Total Pages: 13 (Year: 2023).

Yuan et al., R-Judge: Benchmarking Safety Risk Awareness for LLM Agents, arXiv:2401.10019v1 [cs.CL] Jan. 18, 2024; Total Pages: 23 (Year: 2024).

Kim, Jaewoong, "From RAG to QA-RAG: Integrating Generative AI for Pharmaceutical Regulatory Compliance Process", arXiv: 2402.01717v1 [cs.CL] Jan. 26, 2024; Total Pages: 9 (Year: 2024).

* cited by examiner

MANAGING OPERATIONAL RESILIENCE OF SYSTEM ASSETS USING AN ARTIFICIAL INTELLIGENCE MODEL

CROSS-REFERENCE TO RELATED APPLICATION(S)

This application is a continuation of U.S. application Ser. No. 18/935,417 entitled "IDENTIFYING AND REMEDIATING GAPS IN ARTIFICIAL INTELLIGENCE USE CASES USING A GENERATIVE ARTIFICIAL INTELLIGENCE MODEL" filed on Nov. 1, 2024, which is a continuation-in-part of U.S. patent application Ser. No. 18/889,371 entitled "IDENTIFYING AND REMEDIATING GAPS IN ARTIFICIAL INTELLIGENCE USE CASES USING A GENERATIVE ARTIFICIAL INTELLIGENCE MODEL" filed on Sep. 18, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" filed on May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024.

This application is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. The content of the foregoing applications is incorporated herein by reference in their entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, Gen AI, GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

Generally, organizations are required to adhere to compliance requirements that are set by the government and various regulatory bodies. Different forms of organizations are subject to compliance with a variety of forms of regulations from an assortment of regulatory bodies. For example, there are no standard sets of laws and regulations or definitions for each jurisdiction in which an AI model is used. Many jurisdictions require compliance with the jurisdictions'specific laws and regulations for all uses of AI within their boundaries. For AI models used across borders (e.g., country, state, and local), this creates an overlapping patchwork of regulations and laws. In many circumstances, the laws and regulations are applied differently according to the specific AI model in use in that jurisdiction. Additionally, regulations are changing and can be expected to change in sometimes significant and subtle ways. However, in parallel with the increased complexity of regulations, regulators are taking stronger actions against non-compliance by imposing large penalties and causing potential loss of reputation for non-compliant parties.

Figure 1:
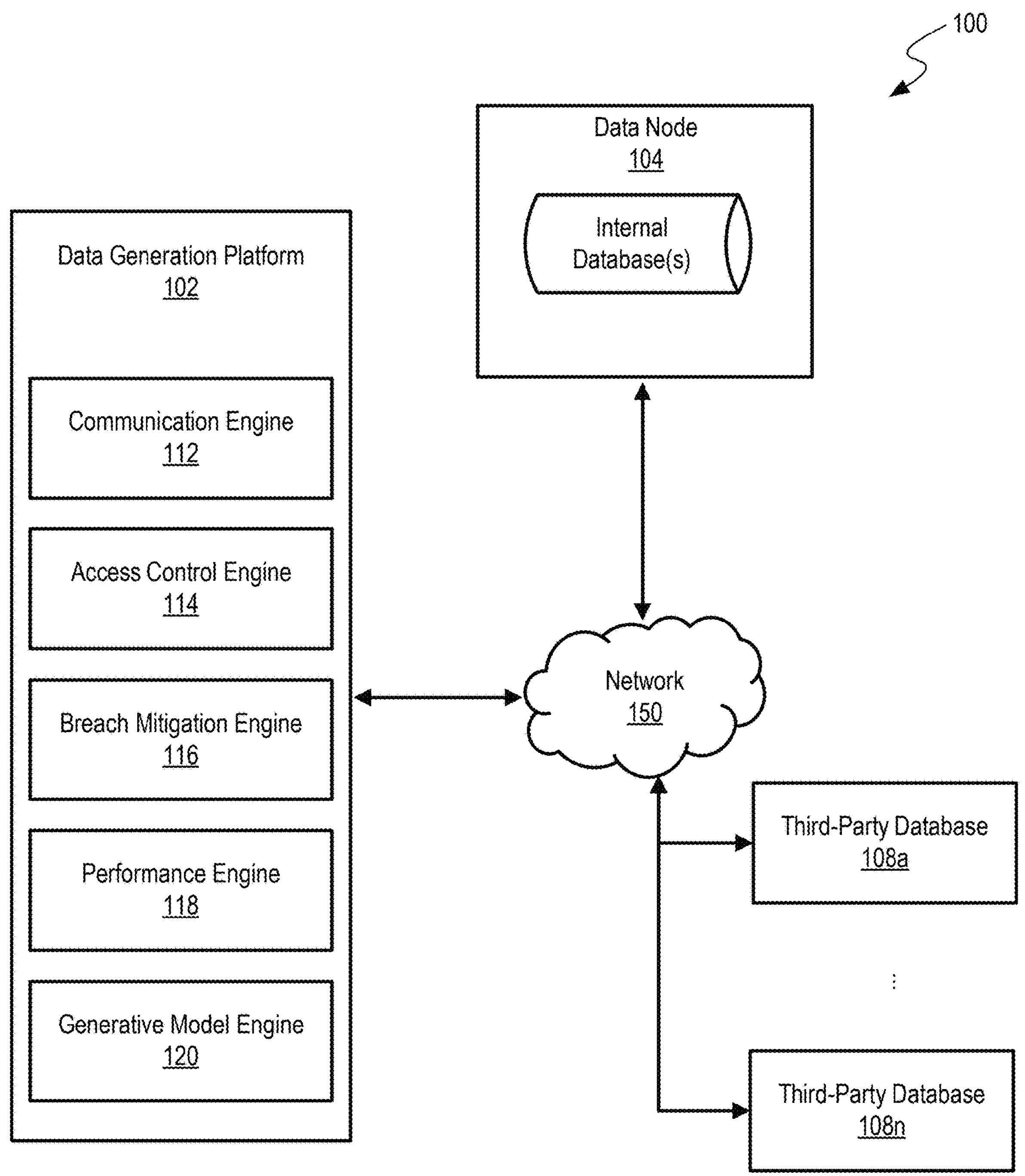
FIG. 1 shows an illustrative environment for evaluating language model prompts and outputs for model selection and validation, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The selected model(s) encounter further challenges with respect to the compliance of AI models with an array of vector constraints (e.g., guidelines, regulations, standards) related to ethical or regulatory considerations, such as protections against bias, harmful language, and intellectual property (IP) rights. For example, vector constraints can include requirements that require AI applications to produce outputs that are free from bias, harmful language, and/or IP rights violations to uphold ethical standards and protect users. Traditional approaches to regulatory compliance often involve manual interpretation of regulatory texts, followed by ad-hoc efforts to align AI systems with compliance requirements. However, the manual process is subjective, lacks scalability, and is error-prone, which makes the approach increasingly unsustainable in the face of growing guidelines and the rapid prevalence of AI applications.

As such, the inventors have further developed a system (e.g., within the data generation platform) to provide a systematic and automated approach to assess and ensure adherence to guidelines (e.g., preventing bias, harmful language, IP violations). The disclosed technology addresses the complexities of compliance for AI applications. In some implementations, the system uses a meta-model that consists of one or more models to analyze different aspects of AI-generated content. For example, one of the models can be trained to identify certain patterns (e.g., patterns indicative of bias) within the content by evaluating demographic attributes and characteristics present in the content. By quantifying biases within the training dataset, the system can effectively scan content for disproportionate associations with demographic attributes and provide insights into potential biases that can impact the fairness and equity of AI applications. In some implementations, the system generates actionable validation actions (e.g., test cases) that operate as input into the AI model for evaluating AI application compliance. The system evaluates the AI application against the set of validation actions and generates one or more compliance indicators and/or a set of actions based on comparisons between expected and actual outcomes and explanations. In some implementations, the system can incorporate a correction module that automates the process of implementing corrections to remove non-compliant content from AI models. The correction module adjusts the parameters of the AI model and/or updates training data based on the findings of the detection models to ensure that non-compliant content is promptly addressed and mitigated.

Unlike manual processes that rely on humans to interpret guidelines and assess compliance, the system can detect subtleties that traditional methods for content moderation often struggle to identify. The system can parse and analyze text data within the response of the AI model and identify nuanced expressions, connotations, and cultural references that can signal biased or harmful content. Additionally, by standardizing the validation criteria, the system establishes clear and objective criteria for assessing the content of an AI application, thereby minimizing the influence of individual biases or interpretations. The system can process large volumes of content rapidly and consistently, ensuring that all content is evaluated against the same set of standards and guidelines, reducing the likelihood of discrepancies or inconsistencies in enforcement decisions.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Gaps represent situations where an expected control is either absent or not functioning properly, such as the failure to establish a specific framework within an organization. Operative standards contain controls that can be based on publications such as regulations, organizational guidelines, best practice guidelines, and others. Using manual processes heavily depends on individual knowledge and thus poses a significant risk for potential bias. This subjectivity can result in inconsistent mappings, as different individuals may understand and apply operative standards such as regulatory requirements in varied ways. Further, the sheer volume of identified gaps complicates traditional compliance efforts. Manually managing such a vast number of gaps is not only labor-intensive but also prone to oversights. Another significant disadvantage of traditional methods is the static nature of the mapping process. Conventional approaches often fail to account for the dynamic and evolving nature of regulatory requirements and organizational controls.

As such, the inventors have further developed a system (e.g., an engine within the data generation platform) to use generative AI (e.g., GAI, GenAI, generative artificial intelligence) models, such as an LLM in the above-described data generation platform, to map gaps in controls to corresponding operative standards. The system determines a set of vector representations of alphanumeric characters represented by one or more operative standards, which contain a first set of actions adhering to constraints in the set of vector representations. The system receives, via a user interface, an output generation request that includes an input with a set of gaps associated with scenarios failing to satisfy operative standards of the set of vector representations. Using the received input, the system constructs a set of prompts for each gap, where the set of prompts for a particular gap includes the set of attributes defining the scenario and the first set of actions of the operative standards. Each prompt can compare the corresponding gap against the first set of actions of the operative standards or the set of vector representations. For each gap, the system maps the gap to one or more operative standards of the set of vector representations by supplying the prompt into the LLM and, in response, receiving from the LLM a gap-specific set of operative standards that include the operative standards associated with the particular gap. The system, as compared to conventional approaches, reduces reliance on individual knowledge, thus minimizing personal biases and resulting in more uniform mappings across different individuals and teams. Additionally, the system can efficiently handle the large volumes of gaps that organizations face, significantly reducing the labor-intensive nature of manual reviews.

In another example, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time. When new guidelines are introduced or existing ones are updated, conventional systems typically simply add new actionable items without reassessing the overall set of actionable items to ensure that the new actionable items are not redundant or contradictory to previously set actionable items. The conventional approach further fails to account for subtle shifts in interpretation that may arise from changes in definitions or regulatory language, potentially leading to outdated or irrelevant requirements remaining on the list. Consequently, organizations may end up with an inflated and confusing set of actionable items that do not accurately reflect the current landscape of the guidelines (e.g., the current regulatory landscape).

As such, the inventors have further developed a system (e.g., an engine within the data generation platform) to use generative AI models, such as an LLM in the above-described data generation platform, to identify actionable items from guidelines. The system receives, from a user interface, an output generation request that includes an input for generating an output using an LLM. The guidelines are partitioned into multiple text subsets based on predetermined criteria, such as the length or complexity of each text subset. Using the partitioned guidelines, the system constructs a set of prompts for each text subset. Each text subset can be mapped to one or more actions in the first set of actions. Subsequent actions in this second set can be generated based on previous actions. The system generates a third set of actions by aggregating the corresponding second set of actions for each text subset. Unlike conventional linear processes that result in an overwhelming number of redundant actionable items, by heuristically analyzing guidelines, the system can identify common actionable items without the parsing through the guideline documents word by word. The disclosed system reduces the number of identified actionable items to only relevant actionable items. Moreover, the system's dynamic and context-aware nature allows the system to respond to changes in guidelines over time by reassessing and mapping shifts in actionable items as the shifts occur.

Further, conventional approaches to compliance are insufficient in light of increasingly complex and expansive regulations over system assets (e.g., AI applications, hardware assets, other software assets). Conventional approaches to complying with regulations typically involve manual processes, static documentation, and periodic audits. Though the approach is feasible for traditional systems with well-defined boundaries and limited complexity, regulations are becoming progressively more complex.

Conventional approaches to complying with regulations are particularly challenging due to, for example, the broad definitions of "AI system" or "models" in regulations such as the EU AI Act, which encompass a wide range of automated systems that cannot be manually evaluated due to their volume and complexity. For example, the EU AI Act defines "AI system" broadly, including machine learning models, expert systems, and even simpler rule-based systems, meaning many systems previously not considered AI can now fall under regulatory scrutiny. Conversely, for example, the California Senate Bill 1047 (California SB-1047), defines "covered model" on and after Jan. 1, 2027 as any artificial intelligence model trained using a quantity of computing power determined by the Government Operations Agency where the cost of which exceeds one hundred million dollars when calculated using the average market price of cloud compute at the start of training. Similarly, the California Assembly Bill 2013 (California AB 2013), which is now passed and incorporated into Part 4 of Division 3 of the California Civil Code (commencing with Section 3110), defines "artificial intelligence" as any engineered or machine-based system that can infer from the input it receives how to generate outputs that can influence physical or virtual environments. The broad definitions mean that many AI systems, including those previously not considered under regulatory scrutiny, such as basic machine learning models or simple decision trees used in business operations, can now fall under the purview of this regulation. Further, the definitions for similar terms vary in the different regulations (e.g., EU AI Act versus California SB-1047).

In another example, the Digital Operational Resilience Act (DORA) defines "critical" functions (which thus maps to more stringent operational resilience requirements) as those whose disruption would materially impact the financial stability or operational continuity of the institution. Additionally, DORA mandates that financial institutions identify "critical ICT third-party service providers," or external vendors whose services are "essential" to the institution's "critical" functions. By including any function that could materially impact financial stability or operational continuity, organizations within the financial field must continuously assess and monitor a vast array of processes and dependencies, as most of the system assets of the financial organization could potentially materially impact financial stability. This means that, for financial institutions, the reclassification can lead to increased compliance burdens and necessitate updates to existing documentation and processes. Even long-standing systems that an organization may be previously unaware of needing to monitor and/or document, such as rule-based engines and pattern recognition tools, may now fall under the purview of the new regulations. Further, some regulations require that AI used to ensure compliance must itself comply with the regulation, creating a cyclical challenge where compliance tools must also be regulated.

Moreover, across regulations, definitions at a particular point in time can vary. For example, financial institutions face significant challenges since these organizations are required to maintain extensive documentation for their models under Model Risk Management (MRM) frameworks, which include model development, validation, performance monitoring, and governance processes. The EU AI Act potentially introduces additional documentation requirements, such as transparency reports, risk assessments, and compliance checks specific to AI systems. Similarly, DORA potentially requires detailed documentation of operational resilience measures, such as incident response plans, business continuity strategies, and third-party risk assessments. In another example, the California AB 2013 mandates that developers of Gen AI systems must disclose specific documentation about the datasets used to train or develop these AI systems prior to making the GenAI system public and before any "substantial modifications" are made to the system. Consequently, for compliance purposes, organizational tools and data of any system falling under the applicable regulatory definition of a particular regulation must adhere to the compliance requirements of the particular regulation (e.g., as opposed to standard technical understandings).

Additionally, under particular regulations, system assets such as AI systems are required to be continuously evaluated throughout their lifecycle, and their decisions must be understood and interpreted by humans, necessitating continuous storage of decisions and their rationale. For example, the EU AI Act classifies AI systems into four risk levels: unacceptable risk, high risk, limited risk, and minimal risk. High-risk systems, which include those used in sensitive areas like healthcare, transportation, or law enforcement, require strict compliance with regulations, including transparency, documentation, and human oversight. For high-risk AI systems, companies must implement a risk management system that continuously evaluates the AI system throughout its lifecycle, maintain detailed records of data sources and processing methods, provide clear information about the AI system's operation and limitations, establish protocols for human intervention in critical decision-making processes, and implement robust cybersecurity measures. In another example under California SB-1047, organizations using "covered models" as defined in the regulation are required to implement a comprehensive safety and security protocol, which includes the capability for a full shutdown of the model, and further required to retain unredacted copies of safety protocols and audit reports for as long as the model is in use, plus five years, thus necessitating continuous evaluation. Similarly, even beyond AI applications, the DORA mandates continuous monitoring of information and communication technology (ICT) systems (e.g., system assets) by requiring real-time monitoring systems, incident reporting mechanisms, and risk management frameworks that include continuous assessment of ICT systems. In particular, the DORA expects organizations to know (1) what the organization's information assets are (internal or external, qualitative or quantitative), (2) where they reside in a firm's ICT estate, and (3) how to protect the information assets. Critical ICT assets in the DORA must be mapped to the specific information assets that are linked to the critical ICT asset. Thus, conventional compliance approaches, which often rely on manual periodic processes and static documentation, are insufficient for the continuous monitoring requirement of system assets in particular risk categories.

Further, system assets such as AI systems face added challenges in meeting compliance requirements across multiple interrelated subject matters, such as risk management, data governance, transparency, human oversight, and cybersecurity measures. Each of the evaluated areas demands specialized knowledge, making the documentation process complex and resource-intensive. Documenting compliance across these diverse and interrelated areas involves coordinating efforts across multiple teams, maintaining up-to-date records, and ensuring that all aspects of the system asset adhere to regulatory requirements, which can be a challenging and ongoing task. For example, effective risk management depends on accurate data governance to ensure that data used for risk assessments is reliable and compliant with privacy regulations, while robust cybersecurity measures are necessary to protect the data from breaches, thereby supporting both risk management and data governance efforts. Since the areas are interrelated, duplicating work wastes valuable resources such as CPU usage, storage capacity, and human effort, as multiple teams may redundantly process the same data, run similar compliance checks, and maintain overlapping documentation, leading to inefficiencies and increased operational costs.

Moreover, to monitor compliance of system assets such as AI systems, decisions made by AI systems must be understood and interpreted by humans, which implicitly means that decisions and their rationale should be continuously stored and managed. The requirement presents several challenges, particularly in the context of complex AI models that can operate as "black boxes," where the decision-making process is not easily interpretable. From the user's perspective, the AI model functions as a "black box," where the input is fed into the system, and the output prediction is produced without visibility into the underlying logic. The opaque nature of AI systems makes it difficult to trace how specific decisions are made (especially with complex documentation), thereby complicating the identification of gaps in compliance.

As such, the inventors have further developed a system (e.g., an engine within the data generation platform) to use generative AI models, such as the LLMs in the above-described data generation platform, to manage operational resilience of system assets using an AI model. The system (1) uses an existing inventory of system assets and/or (2) uses the regulatory definitions to create an inventory of the organization's system assets (i.e., observed system assets). To use the regulatory definitions to create an inventory of the organization's system assets, the system can obtain 1) a set of operational data indicating system assets (e.g., a software asset and/or a hardware asset, such as an AI application) used on a set of informational assets within the set of operational data and 2) a set of alphanumeric characters defining one or more operative boundaries of a set of expected system assets configured to adhere to constraints of the set of alphanumeric characters (e.g., the EU AI Act, the California SB-1047, the DORA, the California AB 2013). The set of expected system assets include a set of attributes common among each expected system asset in the set of expected system assets (e.g., attributes of "critical" system assets, attributes of ICT systems). Using the common attributes, a first set of AI models determines a set of observed system assets from the set of operational data (e.g., the observed critical system assets, the observed ICT systems), where each particular observed system asset includes a set of features of the particular observed system asset (e.g., a text-based description of the particular observed system asset, an expected input of the particular observed system asset, an expected output of the particular observed system asset, interdependencies of the particular observed system asset, data supporting the system asset).

Using a second set of AI models (which can be the same as or different from the first set of models), the system maps (e.g., associates, links) each information asset in the set of informational assets indicated by one or more observed system assets to the one or more observed system assets. For each particular observed system asset, a third set of AI models identifies a set of criteria of the particular observed system asset within the set of alphanumeric characters, identify a set of gaps of the particular observed system asset by comparing the set of criteria of the particular observed system asset with the set of features of the particular observed system asset. For example, for each of the identified AI use cases in the inventory, the system examines the AI use case based on the applicable regulations (e.g., the EU AI Act, California SB-1047) using rule-based systems and/or one or more AI models. Using the identified set of gaps, the system can generate a set of actions to be performed related to the particular observed system asset configured to satisfy the set of criteria of the particular observed system asset.

Internally, the system can identify new gaps from automatically refreshed assessments and generate an alert based on the gap (e.g., generating an exceptional trigger for potential "Prohibited" or "High-Risk" AI use cases, or "Critical" ICT assets). In some implementations, the system converts existing documentation (e.g., previously aggregated documentation) into new documentation that meets new regulatory requirements. The system can analyze existing documentation in conjunction with the text of relevant regulations to classify the risk category (while disregarding the preassigned risk rating provided by other regulations). Subsequently, the system utilizes the existing documentation to generate new documentation that complies with the updated regulatory requirements.

Unlike conventional approaches that rely on manual processes, static documentation, and periodic audits, the disclosed systems and methods can generate an inventory, identified through a RAG search of operational data, ensuring that all relevant system assets are accounted for, thereby reducing the compliance burden and ensuring that even previously overlooked system assets are included in the analysis. Further, unlike conventional methods that struggle with varying definitions of terms such as "AI system" or other system assets across different regulations, the disclosed system examines each identified system asset based on applicable regulations using rule-based systems and/or AI models. Further, by classifying system assets into risk categories based on the particular regulations, the system ensures that each use case is evaluated according to the specific requirements of the relevant regulatory framework. This dynamic classification and gap identification process allows for real-time adjustments and continuous compliance, reducing the risk of regulatory breaches and associated penalties. Additionally, the system implements a risk management system that continuously evaluates system assets throughout their lifecycle. By generating timestamped compliance reports and aggregating the required documentation, the system provides a dynamic and automated solution for continuous evaluation, thereby reducing the risk of non-compliance. The system addresses the challenges in meeting compliance requirements across multiple interrelated subject matters by using a single system of generative AI model(s) across the various subject matters, which reduces the need for duplicative work. The system's ability to aggregate documentation and generate compliance reports ensures that all interrelated areas are addressed cohesively, which allows organizations to allocate resources more effectively and reduce operational overhead.

Further, unlike conventional methods that struggle with the opaque nature of complex AI models, the system consolidates the compliance requirements and operational data into a set of gaps in compliance and/or compliance actions that are automatically executed. By mapping compliance requirements to the operational data of the AI systems, such as model inputs and outputs, decision-making processes, and performance metrics, the system can pinpoint specific areas where compliance gaps exist. For instance, if a regulation requires documentation of data sources and processing methods, the system can automatically check the existing documentation against this requirement and flag any discrepancies as compliance gaps.

The methods disclosed herein cause a reduction in greenhouse gas emissions compared to traditional methods for operating models. Every year, approximately 40 billion tons of $CO^2$ are emitted around the world. Power consumption by digital technologies account for approximately 4% of this figure. Further, conventional user device and application settings can sometimes exacerbate the causes of climate change. For example, the average U.S. power plant expends approximately 500 grams of carbon dioxide for every kWh generated. The implementations disclosed herein for conserving hardware, software, and network resources can mitigate climate change by reducing and/or preventing additional greenhouse gas emissions into the atmosphere. For example, managing operational resilience using an artificial intelligence model as described herein reduces electrical power consumption compared to traditional methods. In particular, automating computer-executable compliance and monitoring tasks reduces the need for extensive manual intervention and redundant processes, which can consume additional computational power and energy. Continuously monitoring compliance reduces the need for periodic, resource-heavy audits and assessments, which can traditionally require substantial computational power to process large volumes of data. Spikes in power consumption can lead to higher greenhouse gas emissions. Power plants may need to ramp up production quickly to meet sudden increases in demand, and may rely on less efficient and more polluting sources of energy. For example, instead of conducting quarterly or annual compliance reviews that involve extensive data processing and analysis, the disclosed system can perform compliance monitoring on an ongoing basis to process smaller, incremental data updates, leading to a more consistent energy consumption.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. The continuous monitoring and dynamic compliance management described herein enables the system to detect and address compliance issues as they arise, rather than waiting for the next scheduled review. The proactive approach not only ensures that compliance is maintained more effectively but also reduces the likelihood of significant non-compliance issues that would require extensive corrective actions. By addressing potential problems early, the system lowers the need for resource-intensive remediation efforts, further conserving energy, and obviates the need for wasteful $CO^2$ emissions. Further, keeping system assets such as AI models in compliance with environmental regulations ensures that the system assets themselves adhere to standards that lower their environmental impact. By continuously monitoring and remediating gaps in the energy efficiency of system assets, the system helps reduce the carbon footprint associated with data processing and storage. Compliance with environmental regulations can include requirements for energy efficiency, waste reduction, and sustainable resource use. By meeting these requirements, the system contributes to broader environmental goals, such as reducing greenhouse gas emissions and conserving natural resources. Therefore, the disclosed implementations mitigate climate change and the effects of climate change by reducing the amount of data stored and downloaded in comparison to conventional network technologies.

Attempting to create a system to dynamically identify and remediate gaps in compliance for system assets in view of the available conventional approaches created significant technological uncertainty. Creating such system required addressing several unknowns in conventional approaches in compliance management, such as how to interpret regulations and apply the regulations to the system assets. Regulations vary significantly across different jurisdictions and industries, making it challenging to create a system that can accurately interpret and apply these complex and variable regulatory standards. Similarly, conventional approaches in compliance management did not provide methods of continuously learning and adapting to new regulatory changes and updates.

Conventional approaches rely on periodic reviews and audits, which are not sufficient for the dynamic nature of an organization's system assets, such as AI systems. In view of regulations such as the EU AI act, the California Senate Bill 1047, and the DORA that require continuous compliance, conventional approaches were insufficient because the conventional approaches did not continuously track compliance status and identifying gaps as they arise, but rather during scheduled audits. For example, a conventional system may manually review logs, data processing workflows, and model outputs. The process can include extracting data from various sources, such as databases, log files, and application programming interfaces (APIs), and then manually cross-referencing the data against regulatory requirements. The manual process is not only time-consuming but also prone to human error, and it fails to capture compliance issues that may arise between audits. Conversely, the disclosed system determines how to dynamically meet the requirements of regulations by integrating with the AI models and data pipelines (containing the operational data and guidelines) in real-time, using APIs and event-driven architectures to capture data as it is processed. For instance, the system can automatically scan and interpret regulatory texts, mapping the requirements to specific data processing activities and model behaviors. Further, the system can identify unusual patterns in data access or processing that may suggest a breach of compliance, and can automatically execute computer-executable tasks to remediate breaches in compliance.

To overcome the technological uncertainties, the inventors systematically evaluated multiple design alternatives. For example, the inventors tested various machine learning algorithms to determine which would be most effective for dynamic compliance monitoring given the variable data in a system asset. The inventors experimented with a rule-based approach where predefined rules were manually coded to map system assets to specific regulatory criteria. The method involved creating an extensive database of rules that corresponded to different regulations and manually updating these rules as new regulations emerged. Additionally, the inventors explored a template-based approach, where compliance templates were created for different types of system assets, and these templates were used to guide the compliance monitoring process.

However, the rule-based approach proved to be inflexible and difficult to maintain. As regulations evolved, the manual updating of rules becomes increasingly cumbersome and error-prone, leading to delays in compliance updates and potential gaps in regulatory coverage. Similarly, the template-based approach lacked the granularity needed to address the specific nuances of different system assets due to the variability in regulations. The templates were too generic, resulting in either overly broad compliance checks that can generate numerous false positives or overly narrow checks that can miss compliance issues. Further, given that regulations such as the DORA govern all ICT assets, creating templates for such a large number of different types of system assets was both infeasible and impractical. The variety of jurisdictions, each with its own set of laws and regulations that are subject to change, renders manual compliance efforts equally infeasible and impractical. Additionally, to prove compliance and satisfy audit requirements, a record of compliance must be documented for all time periods under audit.

Thus, the inventors experimented with different methods for dynamically identifying and remediating gaps in compliance. For example, the inventors tested various machine learning models to analyze regulatory texts (e.g., using NLP) and automatically extract relevant compliance criteria to create a system that could adapt to new regulations in real-time. The system can map the extracted criteria to specific system assets using, for example, classification models, such as support vector machines (SVM) and random forests, to categorize system assets based on regulatory requirements. The system can use the criteria to continuously monitor system assets, to identify deviations from expected behavior that could indicate compliance issues.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can use model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108*a*-108*n* via a network 150. The data generation platform 102 can include software, hardware, or a combination of both and can reside on a physical server or a virtual server (e.g., as described in FIG. 3) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108*a*-108*n* directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representation (e.g., arrays of values) that represent the semantic meaning of unstructured data (e.g., text data, audio data, or other similar data). For example, the data generation platform 102 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases 108*a*-108*n* and can transmit data to such nodes. Additionally or alternatively, the access control engine 114 can receive data from and/or send data to the communication engine 112, the breach mitigation engine 116, the performance engine 118, and/or the generative model engine 120.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases 108*a*-108*n*).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the generative model engine 120, and/or other components associated with the network 150 (e.g., the data node 104 and/or the third-party databases 108*a*-108*n*).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases 108*a*-108*n*).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Suitable Computing Environments for the Data Generation Platform

Figure 2:
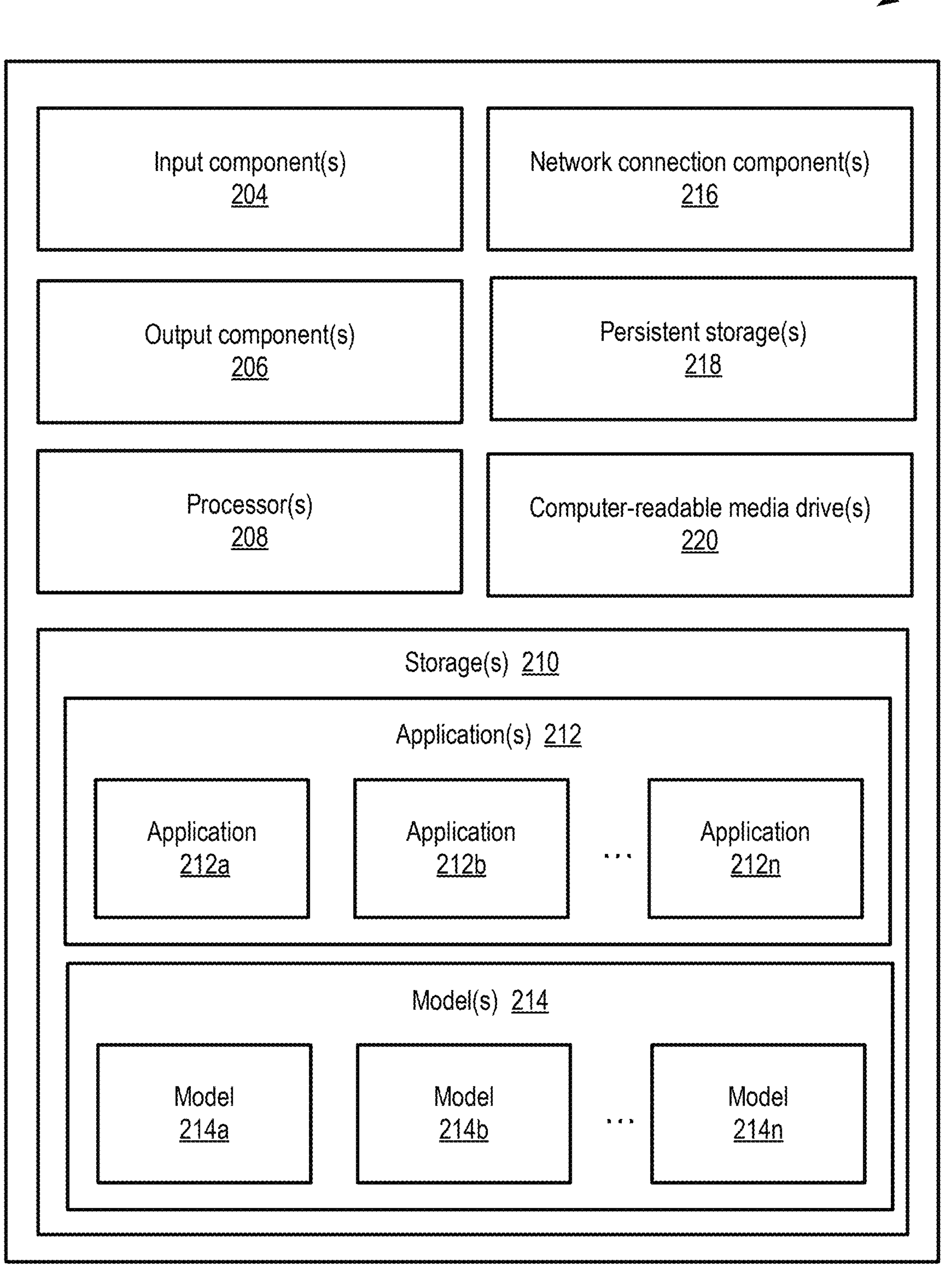
FIG. 2 shows a block diagram showing some of the components typically incorporated in at least some of the computer systems and other devices on which the disclosed system operates in accordance with some implementations of the present technology.

FIG. 2 shows a block diagram showing some of the components typically incorporated in at least some of the computer systems and other devices 200 on which the disclosed system (e.g., the data generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
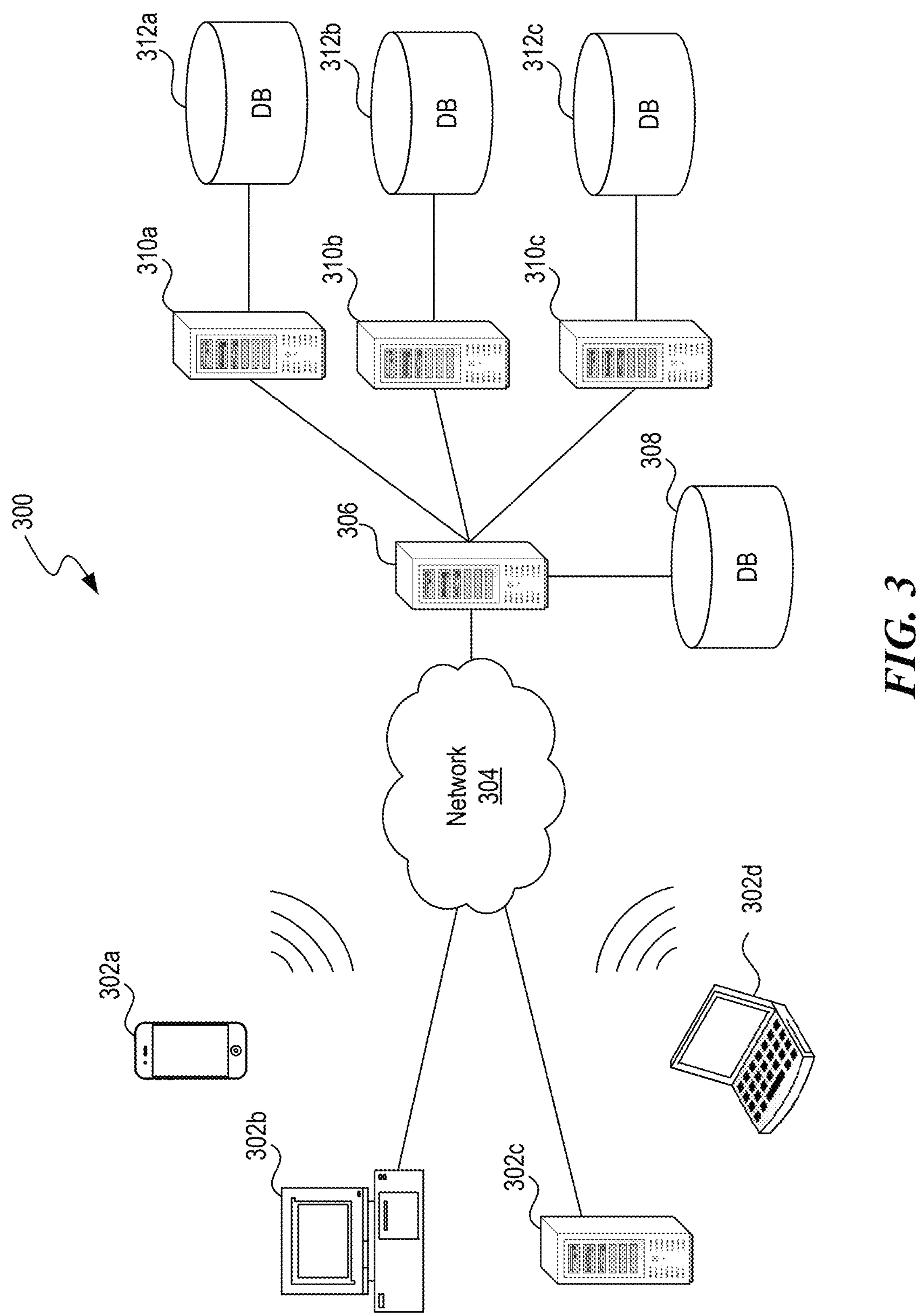
FIG. 3 is a system diagram illustrating an example of a computing environment in which the disclosed system operates in some implementations of the present technology.

FIG. 3 is a system diagram illustrating an example of a computing environment 300 in which the disclosed system operates in some implementations of the present technology. In some implementations, environment 300 includes one or more client computing devices 302*a*-302*d*, examples of which can host graphical user interfaces associated with client devices. For example, one or more of the client computing devices 302*a*-302*d* includes user devices and/or devices associated with services requesting responses to queries from LLMs. Client computing devices 302 operate in a networked environment using logical connections through network 304 (e.g., the network 150) to one or more remote computers, such as a server computing device (e.g., a server system housing the data generation platform 102 of FIG. 1). In some implementations, client computing devices 302 can correspond to device 200 (FIG. 2).

In some implementations, server computing device 306 is an edge server that receives client requests and coordinates fulfillment of those requests through other servers, such as server computing devices 310*a*-310*c*. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-310*c*) connect to a corresponding database (308, 312*a*-312*c*). For example, the corresponding database includes a database stored within the data node 104 (e.g., a sensitive token database, an event database, or another suitable database). As discussed above, each server computing device 310 can correspond to a group of servers, and each of these servers can share a database or can have its own database (and/or interface with external databases, such as third-party databases 108*a*-108*n*). In addition to information described concerning the data node 104 of FIG. 1, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Example Implementations of Models in the Data Generation Platform

Figure 4:
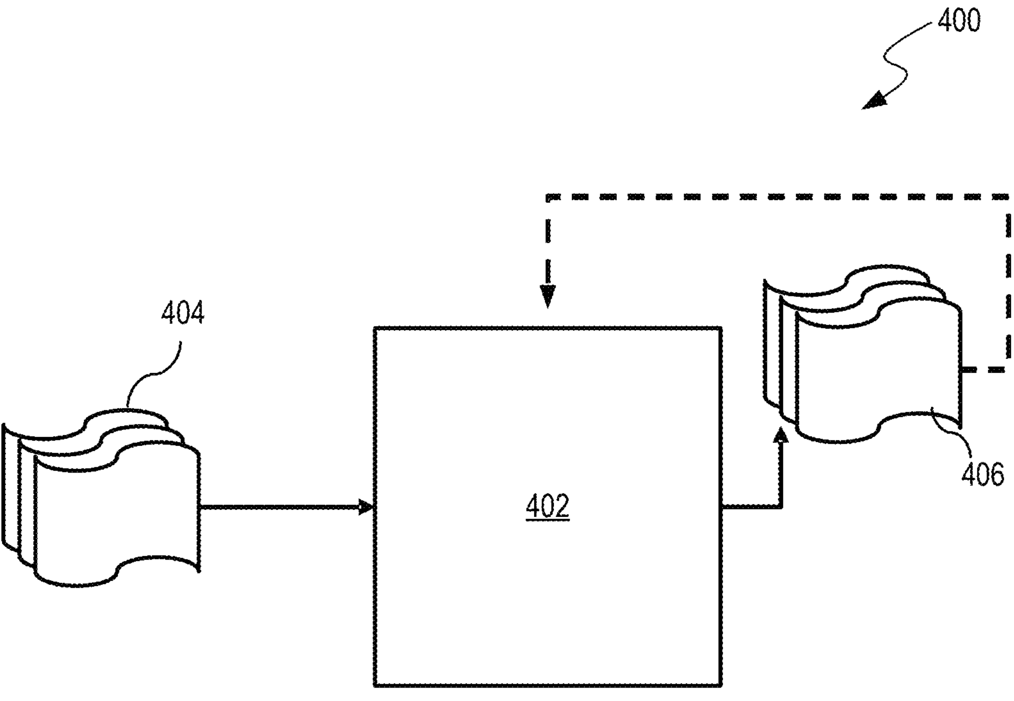
FIG. 4 shows a diagram of an artificial intelligence (AI) model, in accordance with some implementations of the present technology.

FIG. 4 shows a diagram of an AI model, in accordance with some implementations of the present technology. AI model 400 is shown. In some implementations, AI model 400 can be any AI model. In some implementations, AI model 400 can be part of, or work in conjunction with, server computing device 306 (FIG. 3). For example, server computing device 306 can store a computer program that can use information obtained from AI model 400, provide information to AI model 400, or communicate with AI model 400. In other implementations, AI model 400 can be stored in database 308 and can be retrieved by server computing device 306 to execute/process information related to AI model 400, in accordance with some implementations of the present technology.

In some implementations, AI model 400 can be a machine learning model 402. Machine learning model 402 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 4, machine learning model 402 can take inputs 404 and provide outputs 406. In one use case, outputs 406 can be fed back to machine learning model 402 as input to train machine learning model 402 (e.g., alone or in conjunction with user indications of the accuracy of outputs 406, labels associated with the inputs, or other reference feedback information). In another use case, machine learning model 402 can update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 402 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Figure 5:
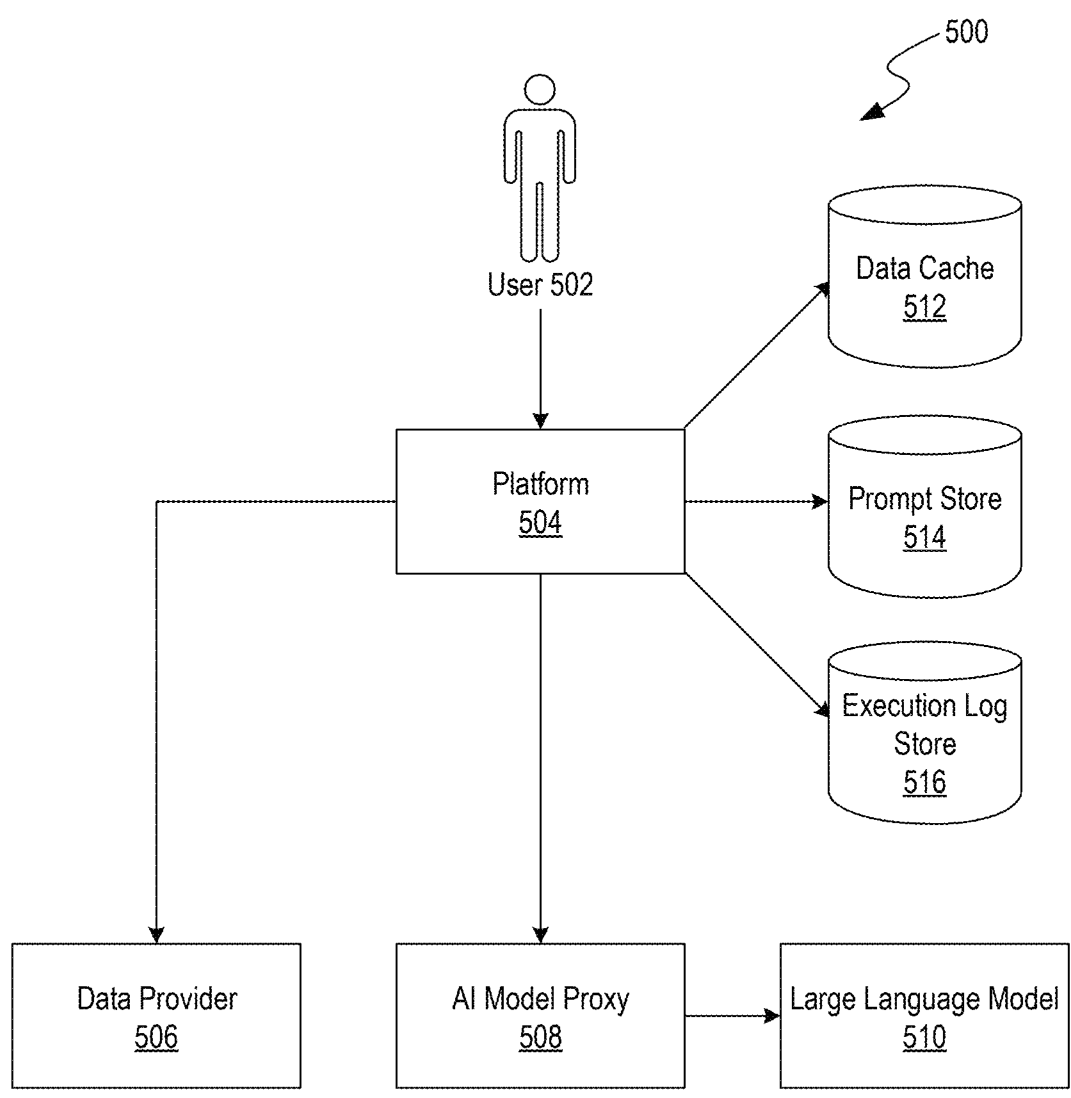
FIG. 5 is an illustrative diagram illustrating an example environment of a platform for automatically managing guideline compliance, in accordance with some implementations of the present technology.

Mapping Gaps in Controls to Operative Standards Using the Data Generation Platform FIG. 5 is an illustrative diagram illustrating an example environment 500 of a platform for automatically managing guideline compliance, in accordance with some implementations of the present technology. Environment 500 includes user 502, platform 504, data provider 506, AI model proxy 508, LLM 510, data cache 512, prompt store 514, and execution store log 516. Platform 504 is implemented using components of example devices 200 and computing devices 302 illustrated and described in more detail with reference to FIG. 2 and FIG. 3, respectively. Likewise, implementations of example environment 500 can include different and/or additional components or can be connected in different ways.

User 502 interacts with the platform 504 via, for example, a user interface. Platform 504 can be the same as or similar to data generation platform 102 with reference to FIG. 1. Users 502 can input data, configure compliance parameters, and manage guideline compliance performance through an intuitive interface provided by the platform. The platform 504 can perform a variety of compliance management tasks, such as compliance checks and regulatory analyses.

Data provider 506 supplies the platform 504 with the data used in the management, which can include regulatory guidelines, compliance requirements, organizational guidelines, and other relevant information. The data supplied by data provider 506 can be accessed via an application programming interface (API) or database that contains policies, obligations, and/or controls in operative standards. In some implementations, the data supplied by data provider 506 contains the publications (e.g., regulatory guidelines, compliance requirements, organizational guidelines) themselves. The structured repository of data provider 506 allows platform 504 to efficiently retrieve and use the data in different management processes. In some implementations, data provider 506 includes existing mappings (e.g., associations, linkages) associated with the operative standards. For example, the pre-established mappings can be between the operative standards and gaps (e.g., issues). In another example, the pre-established mappings can be between the operative standards and publications. Using the existing relationships, the platform 504 can more efficiently map particular identified gaps to the relevant operative standards. For example, if a newly identified gap is similar to or the same as a previously identified gap (e.g., shares similar scenario attributes, metadata tags) within the pre-existing mappings, the platform 504 can use the pre-existing mapping of the previously identified gap to more easily identify the mapping for the newly identified gap.

AI model proxy 508 is an intermediary between the platform and the large language model (LLM) 510. AI model proxy 508 facilitates the communication and data exchange between the platform 504 and the LLM 510. AI model proxy 508, in some implementations, operates as a plugin to interconnect the platform 504 and the LLM 510. The AI model proxy 508, in some implementations, includes distinct modules, such as data interception, inspection, or action execution. In some implementations, containerization methods such as Docker are used within the AI model proxy 508 to ensure uniform deployment across environments and minimize dependencies. LLM 510 analyzes data input by user 502 and data obtained from data provider 506 to identify patterns and generate compliance-related outputs. The AI model proxy 508, in some implementations, enforces access control policies to safeguard sensitive data and functionalities exposed to the LLM 510. For example, the AI model proxy 508 can sanitize the data received from the platform 504 using encryption standards, token-based authentication, and/or role-based access controls (RBAC) to protect sensitive information. The data received can be encrypted to ensure that all sensitive information is transformed into an unreadable format, accessible only through decryption with the appropriate keys. Token-based authentication can be used by generating a unique token for each user session or transaction. The token acts as a digital identifier by verifying the user's identity and granting access to specific data or functions within the system. Additionally, RBACs can restrict data access based on the user's role within the organization. Each role can be assigned specific permissions to ensure that users only access data relevant to the users' responsibilities.

In some implementations, AI model proxy 508 employs content analysis to discern between the sensitive and non-sensitive by identifying specific patterns, keywords, or formats indicative of sensitive information. In some implementations, the list of indicators of sensitive information is generated by an internal generative AI model within the platform 504 (e.g., with a command set that resembles "generate a plurality of examples of PII"). The generative AI model can be trained on a dataset containing examples of sensitive data elements, such as personally identifiable information (PII), financial records, or other confidential information. Once the AI model has been trained, the AI model can generate indicators (e.g., specific patterns, keywords, or formats) of sensitive information based on the model's learned associations. For example, gap data that includes sensitive financial information such as account numbers, transaction details, and personal information of stakeholders can be identified and subsequently removed and/or masked.

Data cache 512 can store data for a period of time to reduce the time required to access frequently used information. Data cache 512 ensures that the system can quickly retrieve necessary data without repeatedly querying the data provider 506, thus improving the overall efficiency of platform 504. In some implementations, a caching strategy is implemented that includes cache eviction policies, such as least recently used (LRU) or time-based expiration, to ensure that the cache remains up-to-date and responsive while optimizing memory usage. LRU allows the data cache 512 to keep track of which data items have been accessed most recently. When the data cache 512 reaches maximum capacity and needs to evict an item (e.g., data packets) to make room for new data, the data cache 512 will remove the least recently used item. Time-based expiration involves setting a specific time duration for which data items are considered valid in the data cache 512. Once this duration expires, the data item is automatically invalidated and removed from the data cache 512 to preserve space in the data cache 512.

Execution store log 516 records some or all actions and processes executed by the platform 504. Execution store log 516 can serve as an audit trail, providing a history of compliance activities and decisions made by the platform 504. Each logged entry in execution store log 516 can include details such as timestamps, user identifiers, specific actions performed, and relevant contextual information. Execution store log 516, in some implementations, can be accessed via the platform 504 via an API.

Execution store log 516 records some or all actions and processes executed by the platform 504. Execution store log 516 can serve as an audit trail, providing a history of compliance activities and decisions made by the platform 504. Each logged entry in execution store log 515 can include details such as timestamps, user identifiers, specific actions performed, and relevant contextual information. Execution store log 516, in some implementations, can be accessed via the platform 504 via an API.

Figure 6:
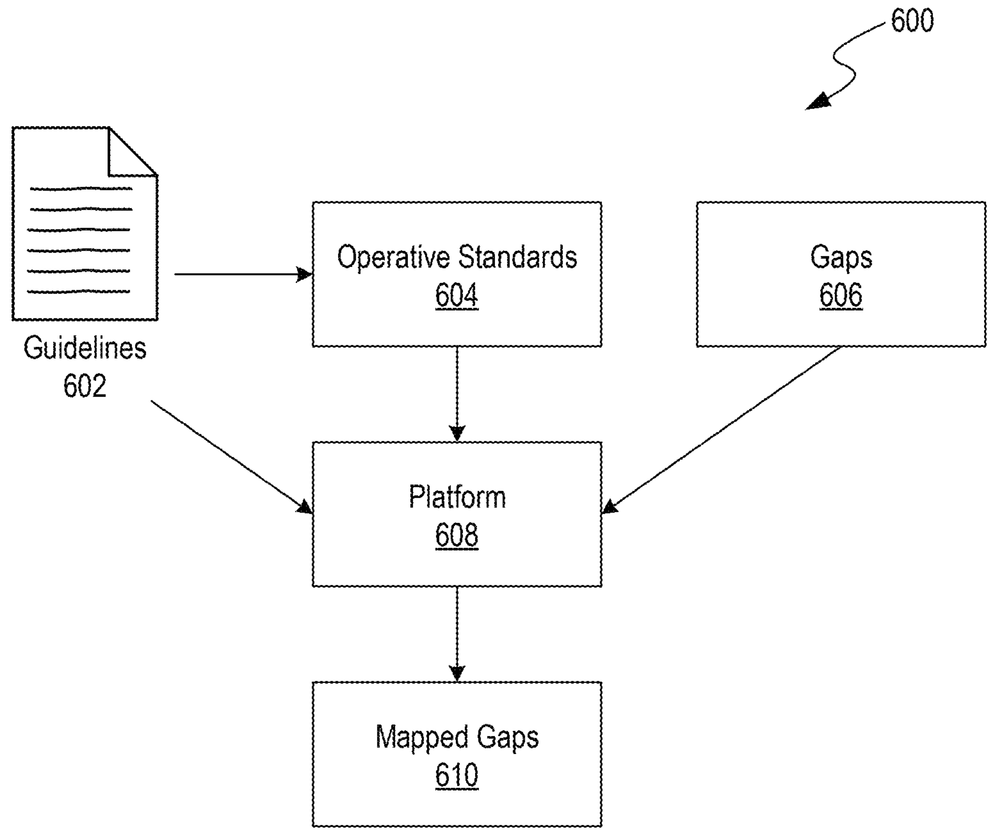
FIG. 6 is an illustrative diagram illustrating an example environment of the platform using guidelines and gaps in controls to generate mapped gaps, in accordance with some implementations of the present technology.

FIG. 6 is an illustrative diagram illustrating an example environment 600 of the platform using guidelines and gaps in controls to generate mapped gaps, in accordance with some implementations of the present technology. Environment 600 includes guidelines 602, operative standards 604, gaps 606, platform 608, and mapped gaps 610. Platform 608 is the same as or similar to platform 504 with reference to FIG. 5. Implementations of example environment 500 can include different and/or additional components or can be connected in different ways.

Guidelines 602 can include publications of regulations, standards, and policies that organizations adhere to. Guidelines 602 serve as the benchmark against which compliance is measured. Guidelines 602 can include publications such as jurisdictional guidelines and organizational guidelines. Jurisdictional guidelines (e.g., governmental regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations. Organizational guidelines include internal policies, procedures, and guidelines established by organizations to govern activities within the organization's operations. Organizational guidelines can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 602 can any one of text, image, audio, video or other computer-ingestible format. For guidelines 602 that are not text (e.g., image, audio, and/or video), the guidelines 602 can first be transformed into text. Optical character recognition (OCR) can be used for images containing text, and speech-to-text algorithms can be used for audio inputs. For example, an audio recording detailing financial guidelines can be converted into text using a speech-to-text engine that allows the system to parse and integrate the text output into the existing guidelines 602. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

In some implementations, the guidelines 602 can be stored in a vector store. The vector store stores the guidelines 602 in a structured and accessible format (e.g., using distributed databases or NoSQL stores), which allows for efficient retrieval and utilization by the platform 608. In some implementations, the guidelines 602 are preprocessed to remove any irrelevant information, standardize the format, and/or organize the guidelines 602 into a structured database schema. Once the guidelines 602 are prepared, the guidelines 602 can be stored in a vector store using distributed databases or NoSQL stores. To store the guidelines 602 in the vector store, the guidelines 602 can be encoded into vector representations. The textual data of the guidelines 602 are transformed into numerical vectors that capture the semantic meaning and relationships between words or phrases in the guidelines 602. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 602. For example, the system can assign higher weights to words that are more unique to a specific document and less common across the entire corpus.

In some implementations, the guidelines 602 are stored using graph databases such as Neo4j™ or Amazon Neptune™. Graph databases represent data as nodes and edges, allowing for the modeling of relationships between guidelines 602 to demonstrate the interdependencies. In some implementations, the guidelines 602 are stored in a distributed file system such as Apache Hadoop™ or Google Cloud Storage™. These systems offer scalable storage for large volumes of data and support parallel processing and distributed computing.

The vector store can be stored in a cloud environment hosted by a cloud provider, or a self-hosted environment. In a cloud environment, the vector store has the scalability of cloud services provided by platforms (e.g., AWS™, Azure™). Storing the vector store in a cloud environment entails selecting the cloud service, provisioning resources dynamically through the provider's interface or APIs, and configuring networking components for secure communication. Cloud environments allow the vector store to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices. Conversely, in a self-hosted environment, the vector store is stored on a private web server. Deploying the vector store in a self-hosted environment entails setting up the server with the necessary hardware or virtual machines, installing an operating system, and storing the vector store. In a self-hosted environment, organizations have full control over the vector store, allowing organizations to implement customized financial measures and compliance policies tailored to the organization's specific needs. For example, organizations in industries with strict data privacy and financial regulations, such as finance institutions, can mitigate security risks by storing the vector store in a self-hosted environment.

Operative standards 604 can be specific obligations derived from the guidelines to comply with the guidelines, and can encompass both specific actionable directives and general principles. In some examples, operative standards 604 can serve as actionable directives that organizations must adhere to in order to meet the requirements laid out in regulatory guidelines or industry best practices (e.g., guidelines 602). For example, an operative standard derived from a data protection guideline might mandate the adoption of a specific framework (e.g., General Data Protection Regulation (GDPR)) for handling personal data, outlining procedures for data access, encryption standards, and breach notification protocols. In another example, an operative standard can include prohibiting a certain action to be taken, such as transmitting confidential information to external sources. In further examples, operative standards 604 encompass the fundamental principles or benchmarks derived from guidelines that guide organizational practices and behaviors towards achieving desired outcomes. For example, in the context of ethical standards within a business, operative standards can include principles such as integrity, transparency, and accountability.

Gaps 606 are instances where the current controls or processes fall short of meeting the operative standards. Gaps 606 can be due to the absence of required controls or the inadequacy of existing controls. For example, in the context of data security, a gap may be identified if a company lacks a comprehensive data encryption policy despite regulatory requirements specifying encryption standards for sensitive information. In another example, though an organization may have implemented access controls for sensitive systems, a gap may be identified when the organization fails to regularly review and update user permissions as required by industry best practices, thereby leaving potential vulnerabilities unaddressed.

Gaps 606 can be managed through a systematic approach that incorporates self-reporting and comprehensive storage of attributes tailored to each scenario associated with the gap 606. A scenario of a gap 606 refers to a specific instance or situation where current controls or processes within an organization do not meet established operative standards 604. Each scenario associated with a gap 606 represents a distinct use case. For instance, a scenario can include a cybersecurity breach due to inadequate data encryption practices, or can include a compliance issue related to incomplete documentation of financial transactions. Each identified gap 606 can be documented with scenario attributes (e.g., metadata, tags) such as a descriptive title, severity level assessment (e.g., graded from 1 to 5, where 1 denotes severe and 5 signifies trivial), and/or tags linking the gap 606 to specific business units or regulatory requirements. The scenario attributes provide a clear understanding of the gap's impact and context. In some implementations, the platform 608 includes a user interface that allows users to input and edit the scenario attributes for each gap of gaps 606.

Platform 608 receives the guidelines, operative standards, and/or identified gaps, and generates mapped gaps 610. The mapped gaps correlate the identified gaps with the specific operative standards the identified gaps fail to meet. Methods of mapping the identified gaps with the specific operative standards are discussed with further reference to FIG. 7.

Figure 7:
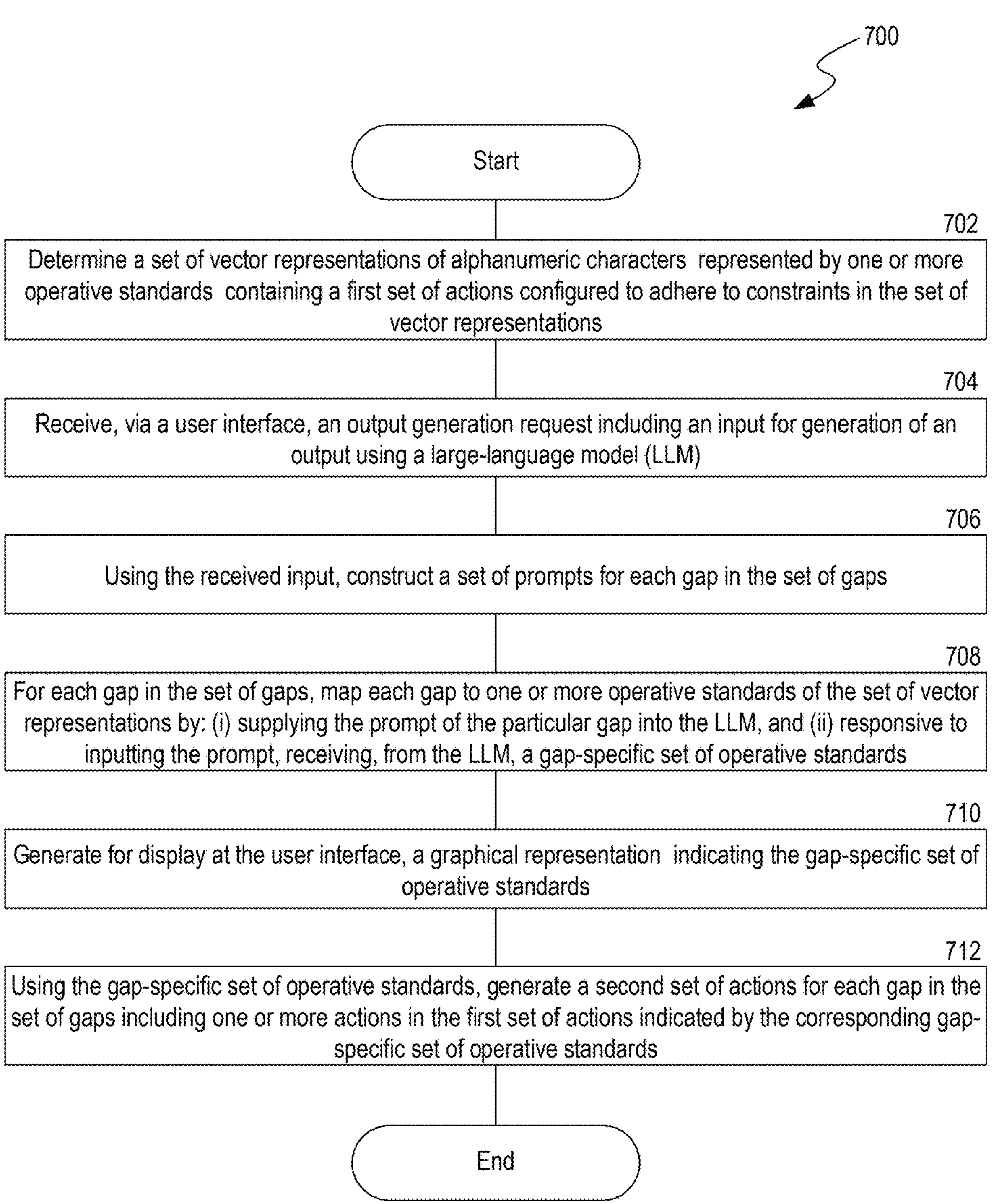
FIG. 7 is a flow diagram illustrating a process of mapping identified gaps in controls to operative standards, in accordance with some implementations of the present technology.

FIG. 7 is a flow diagram illustrating a process 700 of mapping identified gaps in controls to operative standards, in accordance with some implementations of the present technology. In some implementations, the process 700 is performed by components of example devices 200 and computing devices 302 illustrated and described in more detail with reference to FIG. 2 and FIG. 3, respectively. Particular entities, for example, LLM 510, are illustrated and described in more detail with reference to FIG. 5. Likewise, implementations can include different and/or additional steps or can perform the steps in different orders.

In act 702, the system determines a set of vector representations of alphanumeric characters represented by one or more operative standards containing a first set of actions configured to adhere to constraints in the set of vector representations. The set of vector representations of alphanumeric characters is the same as or similar to publications of guidelines 602 discussed with reference to FIG. 6. Methods of transforming different modes (e.g., text, image, audio, video) of guidelines into vector representations are discussed with reference to FIG. 6.

In some implementations, the system receives an indicator of a type of operation associated with the vector representations. The system identifies a relevant set of operative standards associated with the type of the vector representations. The system obtains the relevant set of operative standards, via an Application Programming Interface (API). For example, the system includes input channels or interfaces capable of receiving signals or data tags that denote the type (e.g., nature or purpose) of the vector representations being processed. The system can use an API to retrieve the relevant set of operative standards by implementing API endpoints or integration points that connect the system to a centralized repository or database housing the operative standards that can be tagged with associated metadata related to the type of the vector representation.

In some implementations, the AI model is a first AI model. The system can supply the set of vector representations or the original publications of the guidelines into a second AI model (which can be the same as or different from the first AI model). In response, the system can receive from the second AI model, a set of summaries summarizing the set of vector representations, where at least one prompt in the set of prompts includes one or more summaries in the set of summaries. The set of summaries is a representation of the set of vector representations. The set of summaries, in some implementations, serves as a distilled and coherent representation of the textual content derived from set of vector representations. The set of summaries encapsulates the key themes, sentiments, or pertinent information embedded in the guidelines. The summarization process not only captures the essence of user sentiments but also allows for efficient comprehension and analysis. By condensing voluminous textual content into condensed summaries (e.g., the set of summaries), the system allows users to obtain a comprehensive and accessible understanding of the guidelines. For example, the prompt input into the second AI model can request a summary of the provided text or guidelines by including directives such as "Summarize the following text into key points," or "Provide a concise summary capturing the main themes and most important information." Additionally, the prompt can include context or specific aspects to focus on, such as "Provide the major regulatory requirements and the requirements' implications." The prompt can also include definitions of particular terms, such as operative standards or controls.

In act 704, the system receives, via a user interface, an output generation request including an input for generation of an output using a large-language model (LLM). The input includes a set of gaps associated with one or more scenarios failing to satisfy the one or more operative standards of the set of vector representations. Examples of gaps are discussed with reference to gaps 606 in FIG. 6. Each scenario is associated with a unique identifier and corresponding metrics indicating one or more actions in the first set of actions absent from the scenario. Examples of scenarios are discussed with reference to FIG. 6. Each gap in the set of gaps includes a set of attributes defining the scenario including the unique identifier of the scenario, the corresponding metrics of the scenario, the corresponding vector representations associated with the scenario, a title of the scenario, a summary of the scenario, and/or a severity level of the scenario.

In some implementations, the set of attributes defining the scenario includes a binary indicator of the severity level of the scenario, a category of the severity level of the scenario, and/or a probability associated with the severity level of the scenario. For instance, a binary indicator can be set to '1' for severe (indicating an issue that requires immediate attention) or '0' for non-severe (where the issue is less urgent but still requires resolution). In another example, categories can range from 'Low' to 'High' severity, helping prioritize remedial actions based on the potential impact and risk associated with each scenario. In a further example, a high probability value can indicate that the compliance gap is highly likely to lead to regulatory fines or data breaches if not addressed promptly.

In act 706, using the received input, the system constructs a set of prompts for each gap in the set of gaps. The set of prompts for a particular gap includes the set of attributes defining the scenario, such as scenario identifiers, severity assessments (e.g., criticality level), summaries outlining the compliance issue, the first set of actions (e.g., actionable directives or general principles of FIG. 6) of the one or more operative standards, and/or the set of vector representations. In some implementations, the set of prompts for each gap in the set of gaps includes a set of pre-loaded query contexts defining one or more sets of alphanumeric characters associated with the set of vector representations. The pre-loaded query contexts include predefined templates, rules, or configurations that specify criteria for mapping gaps to operative standards. For example, the pre-loaded query context can include definitions of terms such as operative standards and/or gaps. The prompts serve as input to a large-language model (LLM), which is designed to process natural language inputs and generate structured outputs based on learned patterns and data.

In act 708, for each gap in the set of gaps, the system maps the gap to one or more operative standards of the set of vector representations. The system supplies the prompt of the particular gap into the LLM. Responsive to inputting the prompt, the system receives, from the LLM, a gap-specific set of operative standards including the one or more operative standards associated with the particular gap. In some implementations, the system can generate, for each gap-specific set of operative standard of the set of gap-specific set of operative standards for each gap, an explanation associated with how the one or more operative standards is mapped. The output of the LLM can be in the form of alphanumeric characters. In some implementations, responsive to inputting the prompt, the system receives, from the AI model, the gap-specific set of operative standards, and the corresponding sets of vector representations.

In some implementations, the prompt into the LLM includes a directive to provide a first explanation of why a particular gap should be mapped to a particular operative standard, and also a second explanation of why a particular gap should not be mapped to a particular operative standard. The prompt can further include a directive to provide why the first explanation or the second explanation is weighted more (e.g., why a certain mapping occurs). In some implementations, a human individual can approve or disapprove the mappings based on the first and/or second explanations. Allowing a human-in-the-loop (HITL) and generating a first and second explanation provides transparency to users of the platform regarding the generated mappings.

In act 710, the system generates for display at the user interface, a graphical representation indicating the gap-specific set of operative standards. The graphical representation includes a first representation of each gap in the set of gaps and a second representation of the corresponding gap-specific set of operative standards. In some implementations, each gap is visually represented to highlight its specific attributes, such as severity level, scenario identifier, and a summary detailing the gap. The graphical representations can use charts, diagrams, or visual frameworks that integrate color coding, icons, or annotations to denote severity levels, compliance progress, or overdue actions. Annotations within the graphical representation can offer additional context or explanations regarding each gap and its alignment with operative standards. Overlays can be used to indicate overdue actions, completed mappings, and/or compliance deadlines.

In act 712, using the gap-specific set of operative standards, the system generates a second set of actions for each gap in the set of gaps including one or more actions in the first set of actions indicated by the corresponding gap-specific set of operative standards. The second set of actions can modify a portion of the scenario in the corresponding gap to satisfy the one or more operative standards of the set of vector representations. For instance, actions may involve updating policies, enhancing security measures, implementing new protocols, and/or conducting training sessions to improve organizational practices and mitigate risks. Each action can be linked directly to the corresponding gap and its associated operative standards.

In some implementations, the set of prompts is a first set of prompts, and the gap-specific set of operative standards is a first set of operative standards. Using the received input, the system constructs a second set of prompts for each gap in the set of gaps. The second set of prompts for a particular gap includes the set of attributes defining the scenario and the set of vector representations. Using the second set of prompts, the system receives, from the LLM, a second set of operative standards for each gap in the set of gaps. Using the second set of operative standards, the system constructs a third set of prompts for each gap in the set of gaps. The third set of prompts for the particular gap includes the set of attributes defining the scenario and the first set of actions of the one or more operative standards. Using the third set of prompts, the system receives, from the LLM, a third set of operative standards for each gap in the set of gaps. The iterative approach of using multiple sets of prompts with the LLM enhances the system's capability to adapt and respond dynamically to previously generated mappings and thus contributes to a continuous improvement process where insights gained from each interaction cycle contribute to more refined strategies for achieving alignment of an organization with the operative standards.

In some implementations, the set of prompts is a first set of prompts. For each vector representation in the received set of vector representations, the system identifies a set of textual content representative of the set of vector representations. The system partitions the set of textual content into a plurality of text subsets of the set of textual content based on predetermined criteria. The predetermined criteria can include a length of each text subset and/or a complexity of each text subset. For example, the predetermined criteria can be token count or character limit to ensure uniformity and coherence in the division process. Chunking the textual content breaks down a large amount of textual content into manageable units. For token-based partitioning, the system calculates the number of linguistic units, or tokens, within the textual content. These tokens, in some implementations, encompass individual words, phrases, or even characters, depending on the specific linguistic analysis employed. The predetermined token count criterion sets a quantitative guideline, dictating the number of linguistic units encompassed within each chunk. In some implementations, when employing a character limit criterion, the system focuses on the total number of characters within the textual content character limit criterion, in some implementations, involves assessing both alphanumeric characters and spaces, providing a more fine-grained measure of the content's structural intricacies. The predetermined character limit establishes an upper threshold, guiding the system to create segments that adhere to the predefined character limit.

The system can receive user feedback related to deviations between the gap-specific set of operative standards and a desired set of operative standards. The system can iteratively adjust the sets of prompts to modify the gap-specific set of operative standards to the desired set of operative standards. The system can generate action plans, updating compliance strategies, and/or refine operational practices to enhance alignment with the set of vector representations. The system can generate a set of actions (e.g., a modification plan) that adjust the current attributes of the scenario to a desired set of attributes of the scenario. The system can identify the root cause of the difference between the attributes of the scenario and the desired set of attributes of the scenario. For example, the desired set of attributes of the scenario can include a certain action not found in the current attributes of the scenario (e.g., an anonymization procedure). The actions (e.g., the anonymization procedure) can be preloaded into the system.

Generating Actionable Items From Guidelines Using the Data Generation Platform

Figure 8:
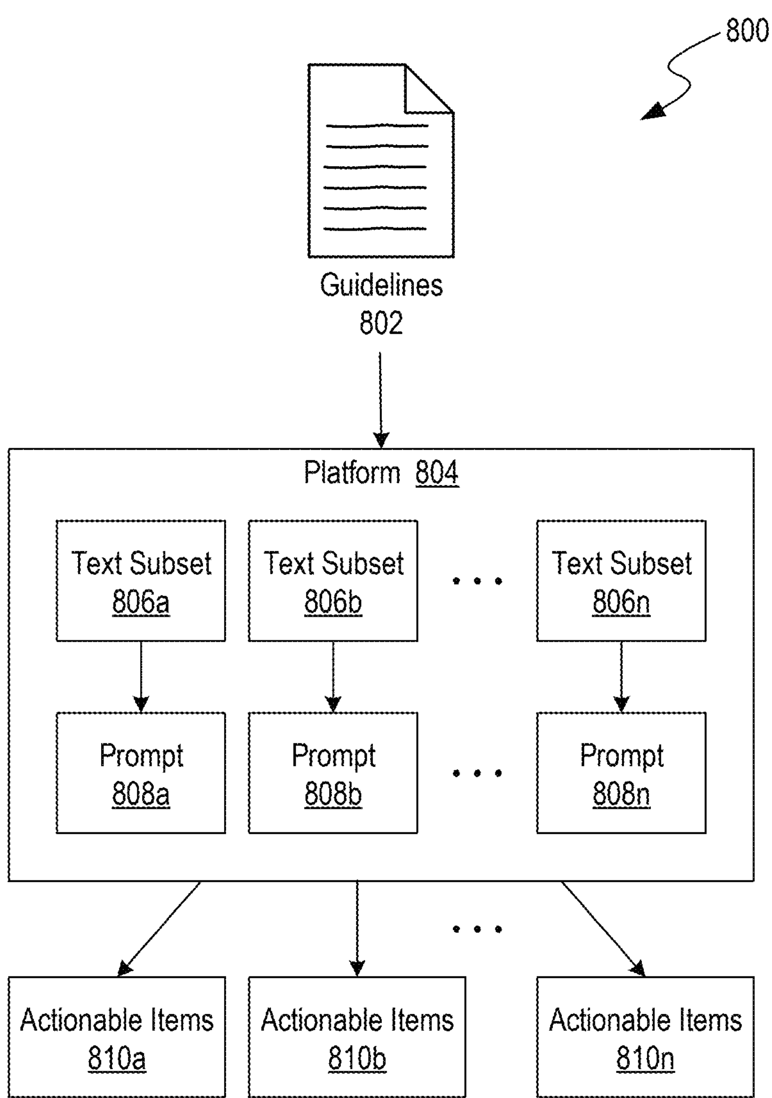
FIG. 8 is an illustrative diagram illustrating an example environment of the platform identifying actionable items from guidelines, in accordance with some implementations of the present technology.

FIG. 8 is an illustrative diagram illustrating an example environment 800 of the platform identifying actionable items 810*a-n* from guidelines 802, in accordance with some implementations of the present technology. Environment 800 includes guidelines 802, platform 804, text subsets 806*a-n*, prompts 808*a-n*, and actionable items 810*a-n*. Guidelines 802 are the same as or similar to guidelines 602 with reference to FIG. 6. Platform 804 is the same as or similar to platform 504 with reference to FIG. 5. Implementations of example environment 800 can include different and/or additional components or can be connected in different ways.

Platform 804 can be a web-based application that hosts various use cases, such as compliance, that allows users to interact via a front-end interface. Inputs to the platform 804 can be guidelines 802 in various formats (e.g., text, Excel). Further examples of platform 804 are discussed with reference to platform 504 in FIG. 5. The backend of platform 804 can chunk (e.g., partition) the guidelines into text subsets 806*a-n* and vectorize the text subsets 806*a-n*. The vectorized representations of the text subsets 806*a-n* can be stored in a database accessible by the platform 804. The platform 804 can use an API call to send prompts to an AI model (such as an LLM), as described further in FIG. 5. The AI model processes the prompts and returns the output of actionable items to the backend of platform 804, which can format the output into a user-friendly structure.

Text subsets 806*a-n* refer to portions of the guidelines 802 that have been extracted or divided (e.g., based on specific criteria) into smaller segments. Each text subsets 806*a-n* can be categorized by topic, section, or other relevant factors. By breaking down large volumes of text into subsets, the platform can focus on specific parts of the guidelines. The structured approach additionally allows the platform to handle large volumes of regulatory text efficiently.

Prompts 808*a-n* are specific queries or instructions generated from the text subsets 806*a-n* that are formulated to direct the behavior and output of an AI model, such as identifying actionable items from the text subsets 806*a-n* of regulatory guidelines 802. For example, for text subset 806*a*, a corresponding prompt 808*a* is constructed. In some implementations, a prompt can include multiple text subsets. In some implementations, a single text subset can be associated with multiple prompts. Prompts 808*a-n* causes the AI model to identify particular attributes of the text subsets 806*a-n*, such as regulatory obligations or compliance requirements to dynamically generate meaningful outputs (e.g., actionable items). In some implementations, the prompts 808*a-n* can be generated using a second AI model. The second AI model can analyze the text subsets 806*a-n* or the guidelines 802 directly to identify features of the text subset such as context, entities, and the relationships between the features by, for example, breaking down the input into smaller components and/or tagging predefined keywords. The second AI model can construct prompts that are contextually relevant using the identified features. For instance, if the input pertains to compliance guidelines, the second AI model can identify sections within the guidelines and frame prompts that highlight the most relevant information (e.g., information directed towards compliance guidelines). The prompts can include specific questions or statements that direct the first AI model to focus on particular aspects, such as "What are the key compliance requirements for data protection in this guideline?"

The second AI model can, in some implementations, employ query expansion. Query expansion is a process that enhances the original query by including synonyms, related concepts, and/or additional contextually relevant terms to improve the comprehensiveness of the response. For example, if the initial prompt is "Identify key actionable items for data protection," the second AI model can expand the query by including keywords such as "privacy regulations," "data security measures," and "information governance." In some implementations, the second AI model can reference domain-specific thesauruses and/or pre-trained word embeddings to find synonyms and related terms to the identified elements.

Prompts 808*a-n* can include definitions, keywords, and instructions that guide the AI model in identifying relevant actionable items. For instance, definitions can clarify what constitutes an "actionable item" or "obligation." Further, prompts 808*a-n* can specify keywords like "must," "shall," or "required." The keywords may indicate mandatory actions or prohibitions that need to be identified as actionable items. For example, a prompt can instruct the AI model to flag any sentence containing the word "must" as it likely denotes a regulatory requirement. In another example, prompts 808*a-n* can direct the AI model to extract all instances of deadlines for compliance actions, descriptions of required documentation, or procedures for reporting to regulatory bodies. Instructions can also include formatting guidelines, ensuring that the extracted actionable items are presented in a consistent and usable format.

Actionable items 810*a-n* (e.g., directives, actions) are the specific tasks or requirements identified by the AI model from the guidelines, based on the analysis of text subsets 806*a-n* and prompts 808*a-n*. In some implementations, rather than being mere excerpts from the text subsets 806*a-n*, actionable items 810*a-n* can be distilled, comprehensive instructions that define specific measures or procedures to implement. For instance, an actionable item might outline the frequency and format of compliance reports required, specify the data to be included, and designate the department responsible for submission. Actionable items 810*a-n* are designed to translate regulatory text into actionable steps that organizations can directly operationalize. Actionable items 810*a-n* can include tasks such as reporting, record-keeping, compliance checks, and other regulatory actions.

Each actionable item can include metadata such as the responsible party within the organization, the type of customer or stakeholder affected, and/or other relevant identifiers. An AI model can use natural language processing (NLP) algorithms to parse through text subsets 806*a-n* to identify relevant phrases, keywords, and semantic structures (e.g., as instructed by the prompts 808*a-n*) that indicate actionable items 810*a-n* within the guidelines 802. Prompts 808*a-n* can direct the AI model by providing contextual cues and specific queries that direct the AI model to focus on particular guidelines or aspects of guidelines within guidelines 802.

Example Implementations of a Validation Engine of the Data Generation Platform

Figure 9:
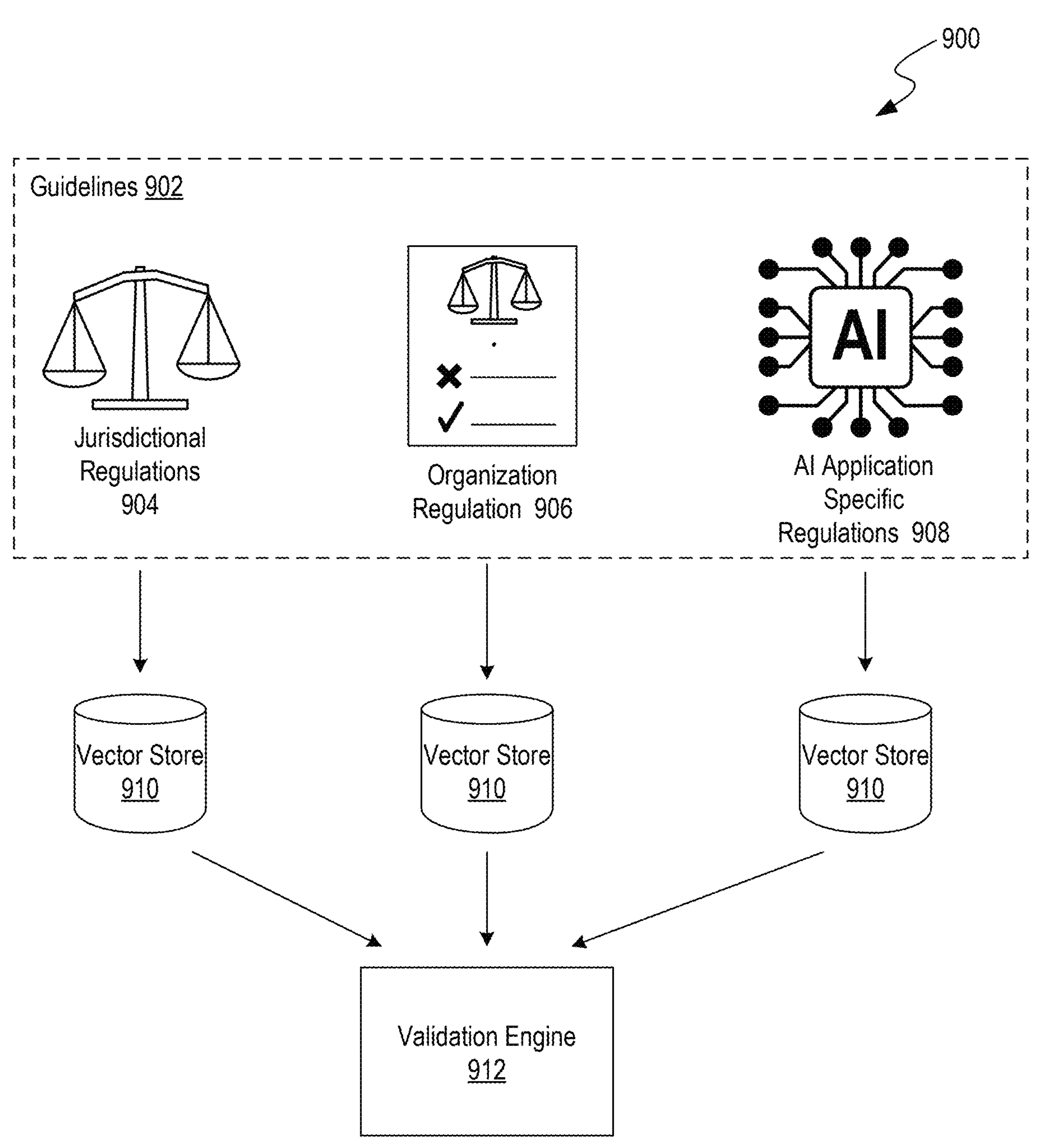
FIG. 9 is a block diagram illustrating an example environment for using the guidelines input into the validation engine for determining AI compliance, in accordance with some implementations of the present technology.

FIG. 9 is a block diagram illustrating an example environment 900 for using the guidelines input into the validation engine for determining AI compliance, in accordance with some implementations of the present technology. Environment 900 includes guidelines 902 (e.g., jurisdictional regulations 904, organization regulation 906, AI application-specific regulations 908), vector store 910, and validation engine 912. Validation engine can be the same as or similar to generative model engine 120 in data generation platform 102 discussed with reference to FIG. 1. Vector store 910 and validation engine 912 are implemented using components of example devices 200 and computing devices 302 illustrated and described in more detail with reference to FIG. 2 and FIG. 3, respectively. Likewise, implementations of example environment 900 can include different and/or additional components or can be connected in different ways.

Guidelines 902 can include various elements such as jurisdictional regulations 904, organizational regulations 906, and AI applications-specific regulations 908 (e.g., unsupervised learning, natural language processing (NLP), generative AI). Jurisdictional regulations 904 (e.g., governmental regulations) can include regulations gathered from authoritative sources such as government websites, legislative bodies, and regulatory agencies. Jurisdictional regulations 904 can be published in legal documents or official publications and cover aspects related to the development, deployment, and use of AI technologies within specific jurisdictions. Organizational regulations 906 includes internal policies, procedures, and guidelines established by organizations to govern AI-related activities within the organization's operations. Organizational regulations 906 can be developed in alignment with industry standards, legal requirements, and organizational objectives. AI application-specific regulations 908 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 902 are stored in a vector store 910. The vector store 910 stores the guidelines 902 in a structured and accessible format (e.g., using distributed databases or NoSQL stores), which allows for efficient retrieval and utilization by the validation engine 912. In some implementations, the guidelines 902 are preprocessed to remove any irrelevant information, standardize the format, and/or organize the guidelines 902 into a structured database schema. Once the guidelines 902 are prepared, the guidelines 902 can be stored in a vector store 910 using distributed databases or NoSQL stores.

To store the guidelines 902 in the vector store 910, the guidelines 902 can be encoded into vector representations for subsequent retrieval by the validation engine 912. The textual data of the guidelines 902 are transformed into numerical vectors that capture the semantic meaning and relationships between words or phrases in the guidelines 902. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 902. For example, the system can assign higher weights to words that are more unique to a specific document and less common across the entire corpus.

In some implementations, the guidelines 902 are stored using graph databases such as Neo4j™ or Amazon Neptune™. Graph databases represent data as nodes and edges, allowing for the modeling of relationships between guidelines 902 to demonstrate the interdependencies. In some implementations, the guidelines 902 are stored in a distributed file system such as Apache Hadoop™ or Google Cloud Storage™. These systems offer scalable storage for large volumes of data and support parallel processing and distributed computing. Guidelines 902 stored in a distributed file system can be accessed and processed by multiple nodes simultaneously, which allows for faster retrieval and analysis by the validation engine.

The vector store 910 can be stored in a cloud environment hosted by a cloud provider, or a self-hosted environment. In a cloud environment, the vector store 910 has the scalability of cloud services provided by platforms (e.g., AWS™, Azure™). Storing the vector store 910 in a cloud environment entails selecting the cloud service, provisioning resources dynamically through the provider's interface or APIs, and configuring networking components for secure communication. Cloud environments allow the vector store 910 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 910 is stored on a private web server. Deploying the vector store 910 in a self-hosted environment entails setting up the server with the necessary hardware or virtual machines, installing an operating system, and storing the vector store 910. In a self-hosted environment, organizations have full control over the vector store 910, allowing organizations to implement customized security measures and compliance policies tailored to the organization's specific needs. For example, organizations in industries with strict data privacy and security regulations, such as finance institutions, can mitigate security risks by storing the vector store 910 in a self-hosted environment.

The validation engine 912 accesses the guidelines 902 from the vector store 910 to initiate the compliance assessment. The validation engine 912 can establish a connection to the vector store 910 using appropriate APIs or database drivers. The connection allows the validation engine 912 to query the vector store 910 and retrieve the relevant guidelines for the AI application under evaluation. Frequently accessed guidelines 902 are stored in memory, which allows the validation engine 912 to reduce latency and improve response times for compliance assessment tasks. In some implementations, only the relevant guidelines are retrieved based on the specific AI application under evaluation. For example, metadata tags, categories, or keywords associated with the AI application can be used to filter the guidelines 902.

The validation engine 912 evaluates the AI application's compliance with the retrieved guidelines 902, (e.g., using semantic search, pattern recognition, and machine learning techniques). For example, the validation engine 912 compares the vector representations of the different explanations and outcomes by calculating the cosine of the angle between the two vectors indicating the vectors' directional similarity. Similarly, for comparing explanations, the validation engine 912 can measure the intersection over the union of the sets of words in the expected and case-specific explanations.

Figure 10:
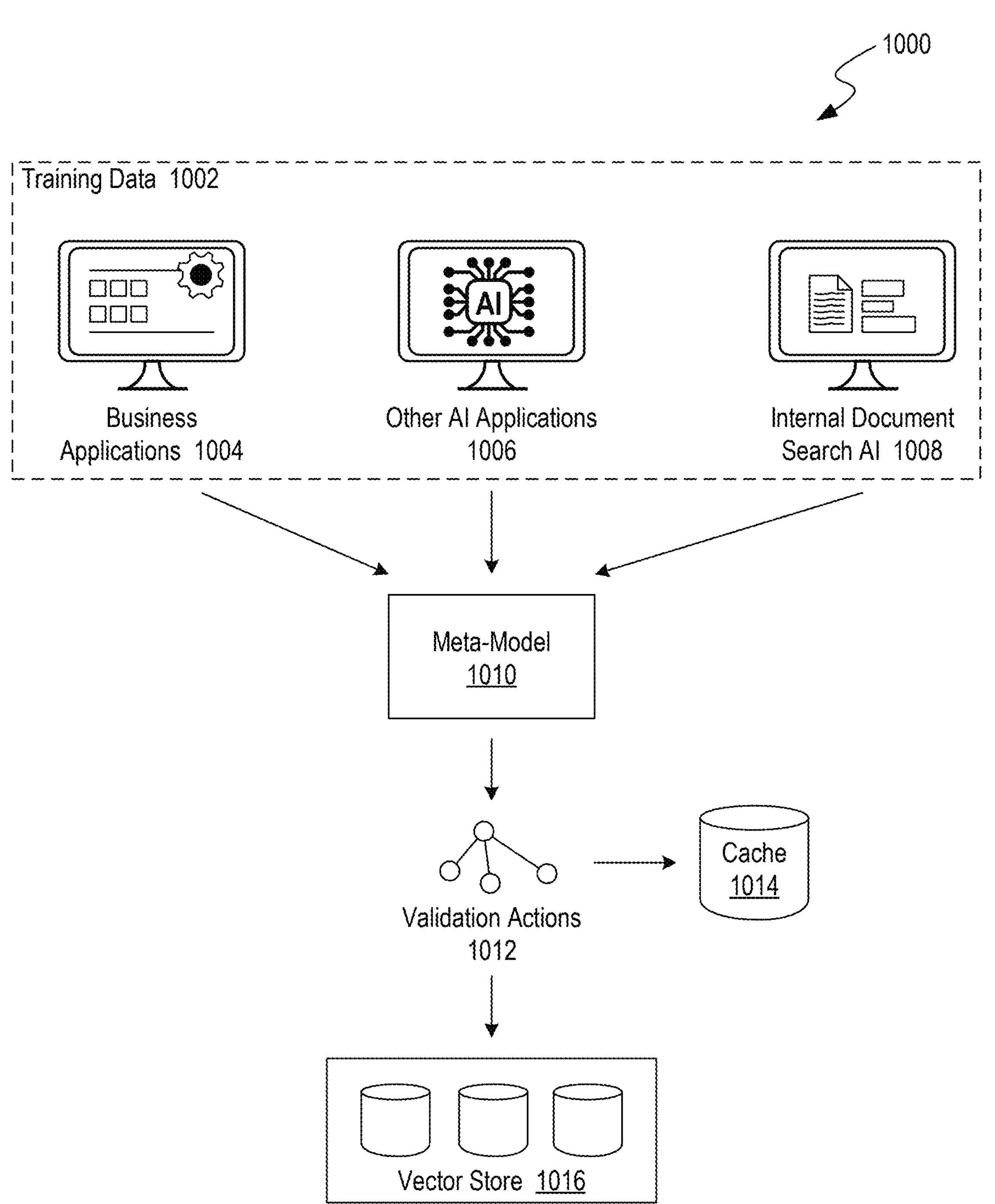
FIG. 10 is a block diagram illustrating an example environment for generating validation actions to determine AI model compliance, in accordance with some implementations of the present technology.

FIG. 10 is a block diagram illustrating an example environment 1000 for generating validation actions to determine AI model compliance, in accordance with some implementations of the present technology. Environment 1000 includes training data 1002, meta-model 1010, validation actions 1012, cache 1014, and vector store 1016. Meta-model 1010 is the same as or similar to meta-model 402 illustrated and described in more detail with reference to FIG. 4. Meta-model 1010 is implemented using components of example devices 200 and computing devices 302 illustrated and described in more detail with reference to FIG. 2 and FIG. 3, respectively. Likewise, implementations of example environment 1000 can include different and/or additional components or can be connected in different ways.

The training data includes data from sources such as business applications 1004, other AI applications 1006, and/or an internal document search AI 1008. Business applications 1004 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1006 can include, for example, credit scoring models, fraud detection algorithms, and risk assessment systems that can be used by lenders to evaluate loan applications. Data from AI applications 1006 refer to various software systems that utilize artificial intelligence (AI) techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1008 is an AI system tailored for searching and retrieving information from internal documents within an organization. For example, the internal document search AI 1008 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1002 is fed into the meta-model 1010 to train the meta-model 1010, enabling the meta-model 1010 to learn patterns and characteristics associated with compliant and non-compliant AI behavior. Further discussion of Artificial Intelligence and training methods are discussed in FIG. 7. The meta-model 1010 leverages the learned patterns and characteristics to generate validation actions 1012, which serve as potential use-cases designed to evaluate AI model compliance. The validation actions 1012 can encompass various scenarios and use cases relevant to the specific application domain of the AI model under assessment. Further methods of creating validation actions are discussed in FIGS. 12-14.

In some implementations, the generated validation actions 1012 can be stored in a cache 1014 and/or a vector store 1016. The cache 1014 is a temporary storage mechanism for storing recently accessed or frequently used validation actions, and facilitates efficient retrieval when needed. On the other hand, the vector store 1016 provides a structured repository for storing vector representations of validation actions, enabling efficient storage and retrieval based on similarity or other criteria. The vector store 1016 stores the generated validation actions 1012 in a structured and accessible format (e.g., using distributed databases or NoSQL stores), which allows for efficient retrieval and utilization by the meta-model 1010. The generated validation actions 1012 can be preprocessed to remove any irrelevant information, standardize the format, and/or organize the generated validation actions 1012 into a structured database schema. Once the generated validation actions 1012 are prepared, the generated validation actions 1012 can be stored in a vector store 1016 using distributed databases or NoSQL stores.

In some implementations, the generated validation actions 1012 are stored using graph databases such as Neo4j™ or Amazon Neptune™. Graph databases represent data as nodes and edges, allowing for the modeling of relationships between generated validation actions 1012 to demonstrate the interdependencies. In some implementations, the generated validation actions 1012 are stored in a distributed file system such as Apache Hadoop™ or Google Cloud Storage™. The systems offer scalable storage for large volumes of data and support parallel processing and distributed computing. Generated validation actions 1012 stored in a distributed file system can be accessed and processed by multiple nodes simultaneously, which allows for faster retrieval and analysis by the meta-model 1010.

The vector store 1016 can be stored in a cloud environment hosted by a cloud provider, or a self-hosted environment. In a cloud environment, the vector store 1016 has the scalability of cloud services provided by platforms (e.g., AWS™, Azure™). Storing the vector store 1016 in a cloud environment entails selecting the cloud service, provisioning resources dynamically through the provider's interface or APIs, and configuring networking components for secure communication. Cloud environments allow the vector store 1016 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1016 is stored on a private web server. Deploying the vector store 1016 in a self-hosted environment entails setting up the server with the necessary hardware or virtual machines, installing an operating system, and storing the vector store 1016. In a self-hosted environment, organizations have full control over the vector store 1016, allowing organizations to implement customized security measures and compliance policies tailored to the organization's specific needs. For example, organizations in industries with strict data privacy and security regulations, such as finance institutions, can mitigate security risks by storing the vector store 1016 in a self-hosted environment.

The meta-model 1010 accesses the generated validation actions 1012 from the vector store 1016 to initiate the compliance assessment. The system can establish a connection to the vector store 1016 using appropriate APIs or database drivers. The connection allows the meta-model 1010 to query the vector store 1016 and retrieve the relevant vector constraints for the AI application under evaluation. Frequently accessed validation actions 1012 are stored in memory, which allows the system to reduce latency and improve response times for compliance assessment tasks.

In some implementations, only the relevant validation actions are retrieved based on the specific AI application under evaluation. For example, metadata tags, categories, or keywords associated with the AI application can be used to filter the validation actions 1012. The relevant validation actions can be specifically selected based on the specific context and requirements of the AI application being evaluated. For example, the system analyzes metadata tags, keywords, or categories associated with the validation actions 1012 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation action 1012 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1012, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions. The tags serve as markers that categorize and organize the validation actions 1012 based on predefined criteria, such as regulatory topics (e.g., data privacy, fairness, transparency) or jurisdictional relevance (e.g., regional regulations, industry standards). The tags provide a structured representation of the validation actions 1012 and allow for easier retrieval, manipulation, and analysis of regulatory content. The tags and associated metadata can be stored in a structured format, such as a database, where each validation action 1012 is linked to the validation action's 1012 corresponding tags and/or regulatory provisions.

The meta-model 1010 evaluates the AI application's compliance with the vector constraints through the use of validation actions 1012 (e.g., using semantic search, pattern recognition, and machine learning techniques). Further evaluation methods in determining compliance of AI applications are discussed with reference to FIGS. 12-14.

Figure 11:
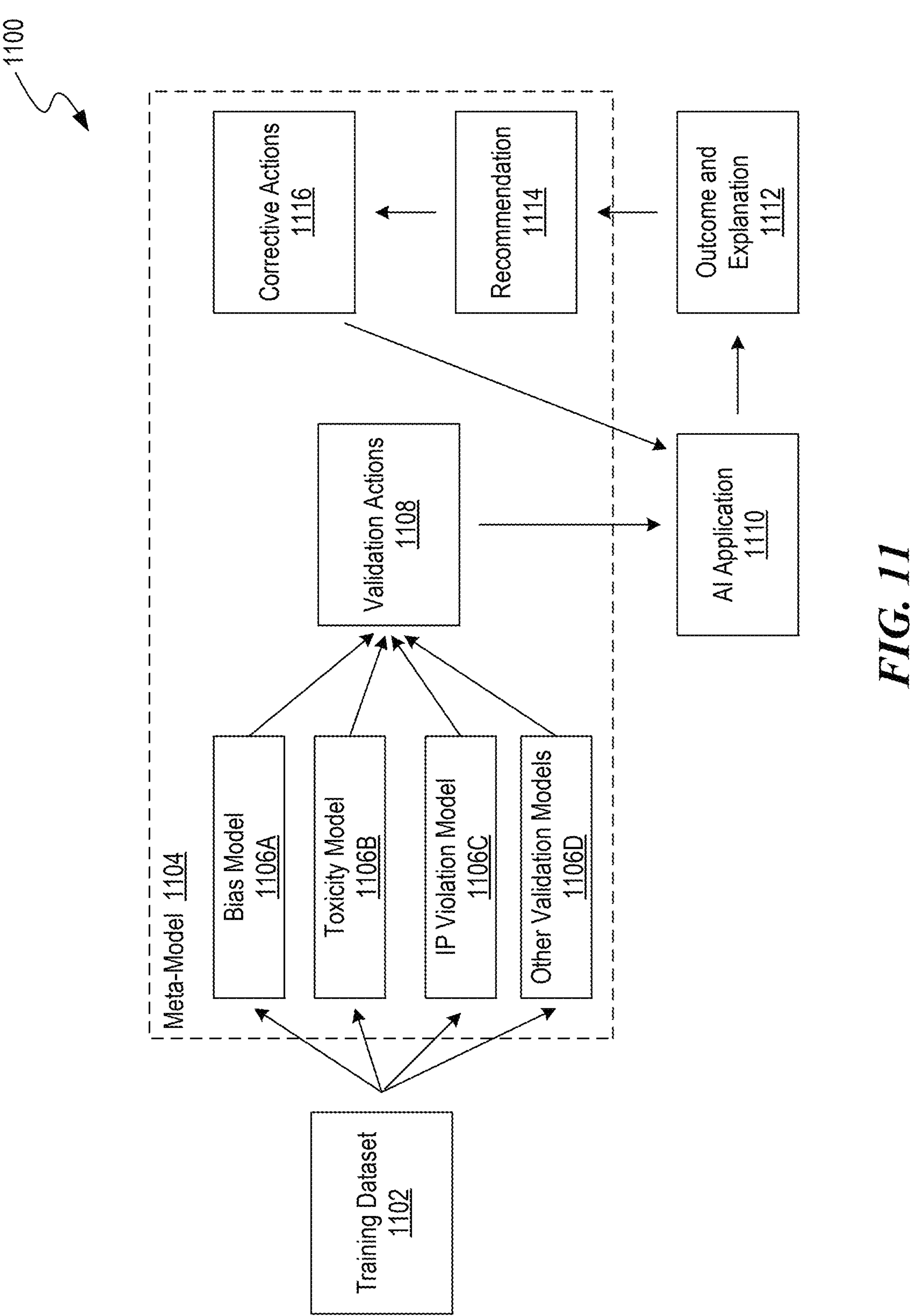
FIG. 11 is a block diagram illustrating an example environment for automatically implementing corrective actions on the AI model, in accordance with some implementations of the present technology.

FIG. 11 is a block diagram illustrating an example environment 1100 for automatically implementing corrective actions on the AI model, in accordance with some implementations of the present technology. Environment 1100 includes training dataset 1102, meta-model 1104 (which includes validation models 1106A-D, validation actions 1108, AI application 1110), outcome and explanation 1112, recommendation 1114, and corrective actions 1116. Meta-model 1104 is the same as or similar to meta-model 1010 illustrated and described in more detail with reference to FIG. 10. Meta-model 1104 and AI application 1110 are implemented using components of example devices 200 and computing devices 302 illustrated and described in more detail with reference to FIG. 2 and FIG. 3, respectively. Likewise, implementations of example environment 1100 can include different and/or additional components or can be connected in different ways.

A training dataset 1102, which includes a collection of data used to train machine learning models, is input into the meta-model 1104. The meta-model 1104 is a comprehensive model that encompasses multiple sub-models tailored to address specific aspects of AI compliance. Within the meta-model 1104, various specialized models are included, such as a bias model 1106A (described in further detail with reference to FIG. 5), a toxicity model 1106B (described in further detail with reference to FIG. 6), an IP violation model 1106C (described in further detail with reference to FIG. 7), and other validation models 1106D. Each of the models is responsible for detecting and assessing specific types of non-compliant content within AI models. Upon processing the training dataset 1102, each model generates validation actions tailored to evaluate the presence or absence of specific types of non-compliant content. Further evaluation techniques in generating validation actions using the meta-model 1104 are discussed with reference to FIGS. 12-14.

The set of generated validation actions 1108 is provided as input to an AI application 1110 in the form of a prompt. The AI application 1110 processes the validation actions 1108 and produces an outcome along with an explanation 1112 detailing how the outcome was determined. Subsequently, based on the outcome and explanation 1112 provided by the AI application 1110, the system can generate recommendations 1114 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 5, if certain attributes exhibit unexpected associations or distributions, the system can retrain the tested AI model with revised weighting schemes to better align with the desired vector constraints. In a toxicity model, such as the ML model discussed in FIG. 6, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 7, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of artificial Intelligence and training methods are discussed in FIG. 7. The recommendations 1114 can be automatically implemented as corrective actions 1116 by the system. The automated approach streamlines the process of addressing identified issues and ensures swift remediation of non-compliant content within AI models, enhancing overall compliance and reliability.

Figure 12:
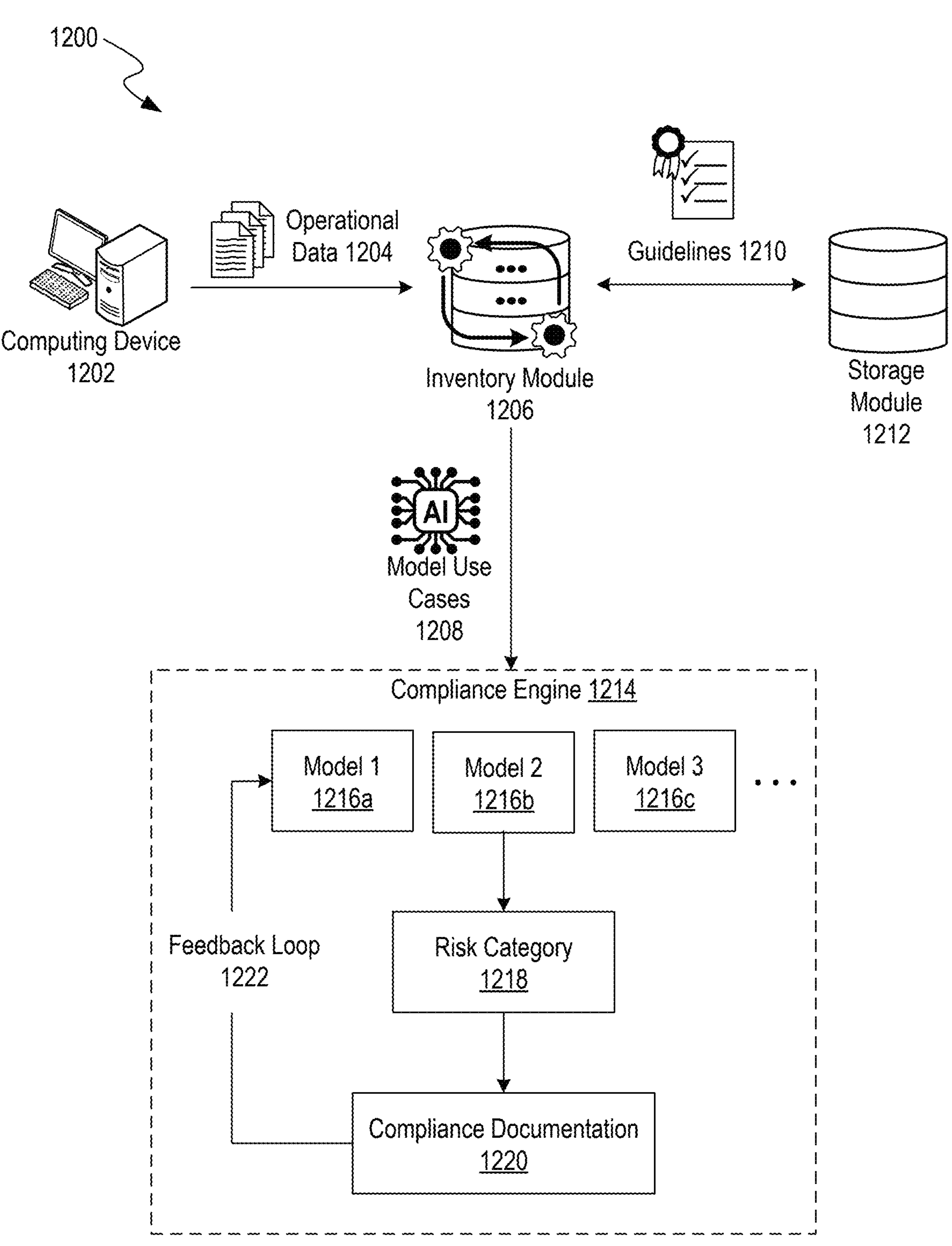
FIG. 12 is a block diagram illustrating an example environment for identifying and remediating gaps in compliance for AI use cases using a generative AI model, in accordance with some implementations of the present technology.

Identifying and Remediating Gaps in AI Use Cases Using the Data Generation Platform FIG. 12 is a block diagram illustrating an example environment 1200 for identifying and remediating gaps in compliance for AI use cases using a generative AI model, in accordance with some implementations of the present technology. Environment 1200 includes computing device 1202, operational data 1204, inventory module 1206, model use case 1208, guidelines 1210, storage module 1212, compliance engine 1214, models 1216*a*, 1216*b*, 1216*c*, risk category 1218, compliance documentation 1220, and feedback loop 1222. Compliance engine 1214 is the same as or similar to generative model engine 120 illustrated and described in more detail with reference to FIG. 1. Likewise, implementations of example environment 1200 can include different and/or additional components or can be connected in different ways.

Computing device 1202 refers to any electronic device capable of processing data and executing instructions, such as a server, desktop computer, or mobile device. Computing device 1202 and compliance engine 1214 are implemented using components of example devices 200 and computing devices 302 illustrated and described in more detail with reference to FIG. 2 and FIG. 3, respectively. A computing device 1202 can process operational data 1204, which includes real-time and historical data related to the AI use cases, such as performance metrics, user interactions, and system logs. Operational data 1204 encompasses data generated and used by the AI systems within the organization. The data is collected from various sources and is used to monitor the performance and behavior of AI models. For instance, operational data 1204 can include user interaction logs from a chatbot AI, performance metrics from a predictive maintenance AI, and/or system logs from an image recognition AI.

In some implementations, the operational data 1204 is collected in real-time from various endpoints and sensors. For example, user interaction logs from a chatbot AI can be captured through API calls and stored in a centralized database (e.g., inventory module 1206). Similarly, system logs from an image recognition AI can be collected from server logs that record every instance of image processing and recognition events. In some implementations, the operational data 1204 is appended with additional contextual information before being sent to the inventory module 1206. For example, the operational data 1204 can be appended with metadata such as timestamps, user IDs, and location data to provide a context of the breadth of impact of the AI application. For example, user interaction logs from a chatbot AI can be tagged with user demographics or geographical coordinates of the deployment area, or system logs from an image recognition AI could be annotated with the types of images being processed.

The operational data 1204 is sent from computing device 1202 to inventory module 1206. Inventory module 1206 maintains a list of AI use cases (e.g., model use case 1208) within the organization. The inventory module 1206 categorizes and stores information about each model use case 1208, including its purpose, functionality, and associated operational data 1204. For example, the inventory module can list an AI use case for fraud detection in financial transactions, detailing the algorithms used, the data inputs (e.g., transaction records), and the expected outputs (e.g., fraud alerts). In some implementations, the operational data 1204 can include documents associated with a degree of risk of particular organizational systems (e.g., model use case 1208). The documents can provide, for example, descriptions of the AI models, their intended use, performance metrics, validation results, and/or risk assessments. In some implementations, the documents can further include historical performance data, such as past incident reports of a particular organizational system. Additionally or alternatively, the operational data 1204 can include documents associated with a degree risk of new or non-implemented organizational systems, activities, and/or initiatives. The documents can be, for example, previously performed evaluations of the risks introduced by the new systems within the organization. By incorporating these documents, the compliance engine 1214 can assess the potential impact of new activities on the overall risk profile and/or the risk profile of other existing systems.

The operational data 1204 can further include documents associated with each (or nearly all) computer system in use by the organization, and can include internal documents and/or third-party documents. The documents can include information related to each computer system of the organization, such as the system's purpose, data inputs and outputs, software and hardware components, and/or any known associated risks (e.g., metadata tags that tag portions of operational data 1204 a pre-loaded perceived risk level according to past organizational guidelines). Likewise, the operational data 1204 can include documents associated with computer systems of third parties, such as documents of the third party's software and/or hardware, which can be internal and/or external to the third party. In some implementations, the third-party system documents can further include third-party audit reports and/or compliance certifications. Including operational data 1204 associated with third-party systems enables the organization to ensure that the third-party systems meet the same regulatory and compliance standards as internal systems, mitigating the risk of regulatory breaches due to third-party components.

In some implementations, operational data 1204 can encompass both structured and unstructured data of the organization. Structured data can include organized information such as performance metrics, user interaction logs, and system logs stored in a structured (e.g., tabular) format within databases. Unstructured data, on the other hand, includes text, images, audio, and video files that do not follow a predefined schema. For instance, user feedback in the form of text reviews, images processed by an image recognition AI, and audio recordings from voice assistants, and so forth. Methods of extracting model use case 1208 from operational data 1204 is discussed in further detail with reference to FIG. 14.

The inventory module 1206 organizes the operational data 1204 into one or more model use cases 1208, and sends the model use cases 1208 to the compliance engine 1214. Model use case 1208 refers to the specific application or scenario in which an AI model is used. Each model use case 1208 includes at least a portion of the operational data 1204 containing information about the AI system's objectives, data inputs and outputs, and the algorithms employed. For example, a model use case 1208 for a recommendation system can include the objective of increasing user engagement, data inputs such as user behavior data, and outputs like personalized content recommendations. The information can be used to determine the regulatory requirements that apply to each use case and for assessing compliance using methods discussed with reference to FIG. 14. In some implementations, model use case 1208 can include metadata describing the model's training data, validation methods, and performance metrics. For instance, the metadata can include details about the sources of training data, the preprocessing steps applied, the algorithms and hyperparameters used, and/or the methods employed for validating the model's accuracy and robustness. Performance metrics such as precision, recall, and/or F1 score can be included in model use case 1208 to provide a quantitative assessment of the model's effectiveness and/or be used to evaluate the model's compliance.

The inventory module 1206 references the guidelines 1210 to generate an inventory of model use cases containing model use case 1208 using methods discussed with reference to FIG. 14. In some implementations, the inventory of model use cases includes model use cases 1208 defined by corresponding operational data 1204 that the organization identifies as related to an AI system/application. Using organization-specific definitions to filter operational data 1204 enables the compliance engine 1214 to target, for example, computer systems already recognized as AI by the organization. Additionally or alternatively, the inventory of model use cases can include an overall inventory of computer systems in use by the business, which can further encompass both internal systems and third-party systems operating internally and/or externally. The overall inventory ensures that all operational data 1204 (e.g., of organizational systems), even those not initially identified as AI, can be evaluated against regulatory definitions since some operational data 1204 may meet the expanded legal or regulatory definitions of AI, even if the operational data 1204 was not originally classified as such by the business. In some implementations, both sets (full inventory and inventory filtered by organizational definitions) are constructed, and a user can compare the compliance documentation 1220 from the compliance engine 1214 of both sets of inventories.

Guidelines 1210 (e.g., guidelines 602, guidelines 902) can include the regulatory standards and/or best practices that the organization must adhere to when deploying AI systems. The guidelines 1210 can be sourced from various regulatory bodies and industry standards. For instance, guidelines 1210 can include the EU AI Act's/California SB-1047's requirements for transparency and accountability, and/or the GDPR's data protection principles. In another example, guidelines 1210 can include software development lifecycle control (SDLC) documents. SDLC documents can cover one or more requirements/guidelines of the software development lifecycle (e.g., requirements gathering, coding, testing, debugging, deployment, monitoring). Including SDLC documents within the guidelines 1210 ensures that software, including AI systems, are developed and maintained in compliance with best practices and regulatory standards within the SDLC documents. In some implementations, the SDLC documents can include automated testing scripts and/or continuous integration/continuous deployment (CI/CD) pipelines.

In some implementations, guidelines 1210 can be stored in storage module 1212. Storage module 1212 is a repository for storing all relevant data, guidelines, and compliance documentation. Storage module 1212 ensures that information related to the guidelines are stored and easily accessible for compliance assessments and audits. For example, the storage module 1212 can store compliance reports, audit logs, and/or regulatory guidelines. In some implementations, storage module 1212 can use cloud storage solutions to provide scalable and secure data storage options.

The compliance engine 1214 uses criteria within the guidelines 1210 to evaluate the compliance of the model use case 1208 and to identify any gaps that need to be addressed using methods discussed with reference to FIG. 14. Compliance engine 1214 manages the evaluation of the model use case 1208 with criteria from regulatory guidelines 1210. The compliance engine 1214, in some implementations, uses one or more generative AI models (e.g., models **1216*a*, 1216*b*, 1216*c*) to analyze operational data, model use cases, and guidelines to identify gaps in compliance. For example, the compliance engine 1214 can analyze the operational data of a facial recognition AI to ensure the model use case meets privacy regulations, identifying any non-compliant data handling practices and generating actionable recommendations to address the gaps. In some implementations, compliance engine 1214 can use machine learning algorithms to continuously improve its compliance assessment capabilities based on feedback and new regulatory updates using feedback loop 1222**.

Within the compliance engine 1214, models **1216*a*, 1216*b*, and 1216*c* are used to determine the risk category 1218. Models 1216*a*, 1216*b*, and 1216*c* can be the same AI model applied to different aspects of compliance evaluation or different AI models specialized for various compliance tasks. For instance, model 1216*a* can focus on data quality and bias detection, model 1216*b* on algorithmic transparency and explainability, and model 1216*c* on performance metrics and robustness. Models 1216*a*, 1216*b*, and 1216*c* can be implemented using various machine learning and deep learning architectures. For example, model 1216*a* can use a combination of statistical analysis and machine learning classifiers to detect biases in the data. Model 1216*b* can use natural language processing (NLP) techniques to analyze textual explanations and ensure transparency, and model 1216*c* can use neural networks or ensemble methods to evaluate the performance and robustness of the AI model. Each model use case 1208 is evaluated for compliance based on its specific use case and the applicable regulatory guideline(s). For instance, model use case 1208 can be an NLP model used for sentiment analysis, a machine learning model for predictive analytics, or a deep learning model for image classification. The model use case 1208 can include contextual details about, for example, the users, the location, and so forth. In some implementations, models 1216***a*, 1216*b*, and 1216*c* can be deployed on different hardware platforms, such as GPUs or TPUs, to improve performance for specific tasks.

The models 1216*a*, 1216*b*, and 1216*c* can be used to determine the risk category 1218. Risk category 1218 of the model use case 1208 is based on different risk levels of guidelines. The risk categories can be predefined levels, such as low, medium, and high risk, or more granular categories based on specific regulatory guidelines. Each risk category can be associated with compliance requirements and mitigation strategies (e.g., the EU AI Act, California SB-1047). For example, the EU AI Act defines "AI systems" in categories such as "Prohibited," "High-Level," "Limited," and "Minimal" risk. The compliance engine 1214 uses the risk categories to categorize the model use case 1208 under the particular regulatory category. For instance, a model use case 1208 associated with a higher degree of risk, such as autonomous driving, can be classified as "High-Level" risk, which can be associated with more stringent compliance checks and monitoring under a particular regulation. Similarly, California SB-1047 focuses on mitigating "critical harms." Critical harms are defined as severe risks that could result in mass casualties, significant property damage, or other grave threats to public safety and security. The risk category 1218 can be, in this example, "critical harm" or "non-critical harm." In some implementations, the compliance engine 1214 can use a scoring system to quantify the risk category 1218 of the model use case 1208 discussed with reference to FIG. 14.

Compliance documentation 1220 can be derived from the criteria of the risk category 1218. Compliance documentation 1220 includes reports, records, and/or evidence used to demonstrate compliance with regulatory guidelines. The compliance documentation 1220 can be generated by the compliance engine 1214 and/or stored in the storage module 1212. For example, compliance documentation 1220 can include audit reports, compliance checklists, and evidence of corrective actions taken to address identified gaps. In some implementations, compliance documentation 1220 can be automatically generated and updated based on real-time data from the compliance engine using methods discussed with reference to FIG. 14.

Feedback loop 1222 is a mechanism for continuously monitoring and improving compliance. The feedback loop 1222 collects feedback from various sources, such as user interactions, system performance, and regulatory updates, and uses the information to refine the compliance process. For example, the feedback loop 1222 can incorporate user updates to a particular model use case, changes in system performance metrics, and updates to regulatory guidelines. In some implementations, feedback loop 1222 can be used to tune models 1216*a*, 1216*b*, and 1216*c* using methods discussed with reference to FIG. 14. For example, hyperparameters such as the learning rate, regularization parameters, and/or the number of layers in a neural network can be adjusted to enhance model performance. Additionally, algorithm selection can be performed by evaluating and choosing different algorithms based on the feedback data. For example, the compliance engine 1214 can switch from using a decision tree to using a random forest if the latter demonstrates improved performance. Further, the compliance engine 1214 can add new input features derived from user feedback or removing features that do not contribute to the model's performance.

Figure 13:
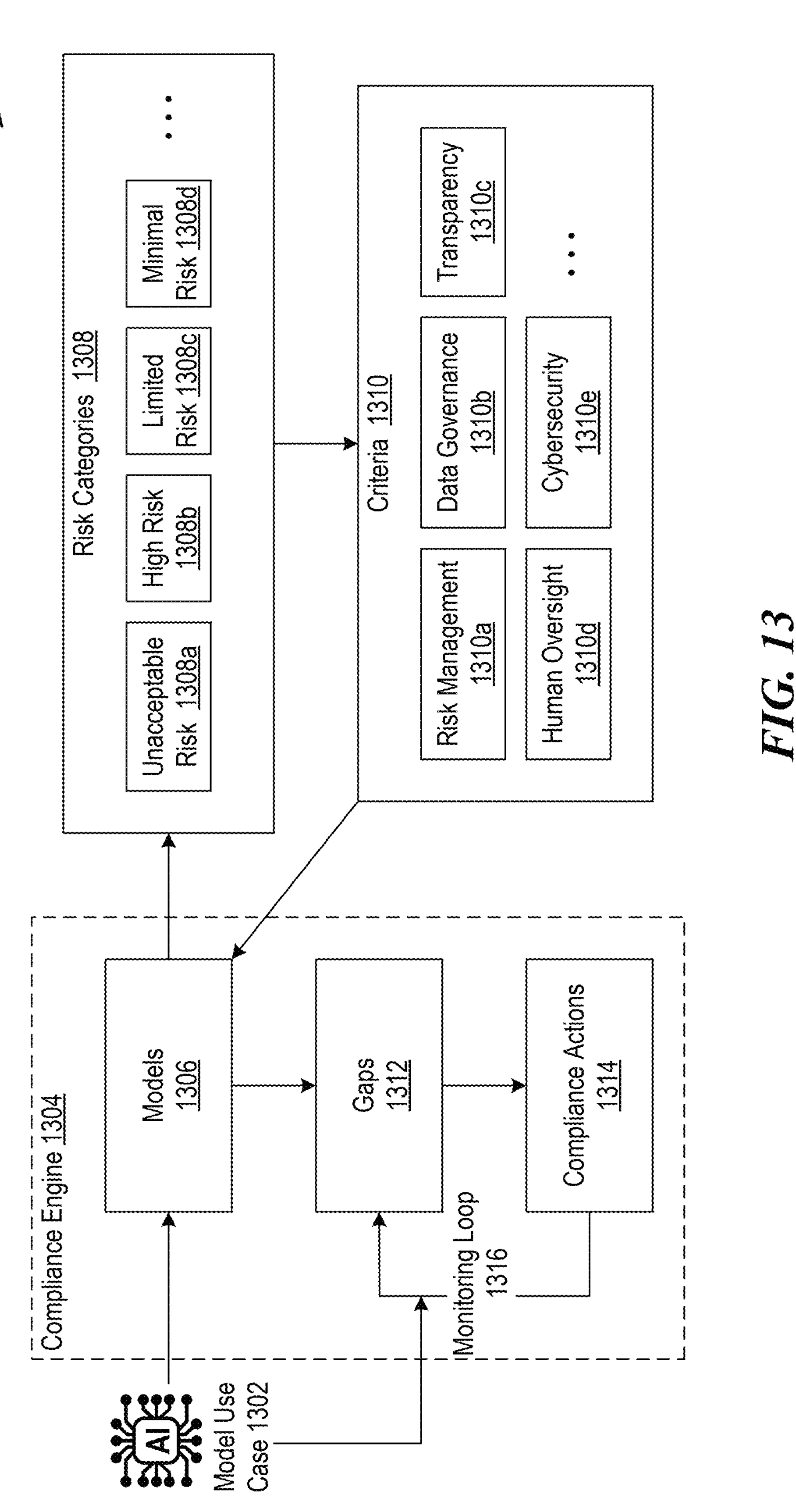
FIG. 13 is a block diagram illustrating an example environment for continuously monitoring compliance in AI use cases using a generative AI model, in accordance with some implementations of the present technology.

FIG. 13 is a block diagram illustrating an example environment 1300 for continuously monitoring compliance in AI use cases using a generative AI model, in accordance with some implementations of the present technology. Environment 1300 includes model use case 1302, compliance engine 1304, models 1306, risk categories 1308, criteria 1310, gaps 1312, compliance actions 1314, and monitoring loop 1316. Model use case 1302 is the same as or similar to model use case 1208 illustrated and described in more detail with reference to FIG. 12. Models 1306 are the same as or similar to models 1206*a*, 1206*b*, 1206*c* illustrated and described in more detail with reference to FIG. 12. Models 1306 are implemented using components of example devices 200 and computing devices 302 illustrated and described in more detail with reference to FIG. 2 and FIG. 3, respectively. Risk categories 1308 are the same as or similar to risk category 1218 illustrated and described in more detail with reference to FIG. 12. Likewise, implementations of example environment 1300 can include different and/or additional components or can be connected in different ways.

Model use case 1302 is a specific application or scenario where an AI model is utilized or can be utilized (e.g., model use case 1208), and defines the boundaries and expectations for the AI model's operation, including the inputs, outputs, and the context in which the model is (or to be/can be) applied. Models 1306 within compliance engine 1304 represent the various AI models employed within the environment 1300. Models 1306 process operational data (e.g., operational data 1204) associated with the model use case 1302, and generating indicators of compliance based on the defined model use cases 1302. The models 1306 can include various types of machine learning algorithms, such as supervised learning models, unsupervised learning models, reinforcement learning models, and deep learning models. Each model 1306 can be trained on specific datasets to perform tasks such as classification, regression, clustering, and anomaly detection. The models 1306 can be continuously updated and retrained with new data to improve their accuracy and performance.

The models 1306 can be domain-specific or generic. Domain-specific models 1306 are tailored to address particular regulations a specific area of a regulation. For example, a domain-specific model for cybersecurity compliance can be trained to ensure adherence to regulations such as the EU AI Act with a focus on cybersecurity requirements. Domain-specific models 1306 can be trained on datasets that include regulatory texts, compliance checklists, and historical compliance data relevant to the specific regulation or specific area of the regulation. For example, a domain-specific model for GDPR cybersecurity compliance would focus on data encryption, access controls, and breach notification requirements. The domain-specific model 1306 can output risk categories and identify gaps in compliance specific to the areas using methods discussed with reference to FIG. 14. Generic models 1306, on the other hand, can output broader risk categories and identify general gaps in compliance that apply across various regulatory frameworks using methods discussed with reference to FIG. 14.

Risk categories 1308 classify potential risks associated with the model use case 1302. The criteria 1310 of each risk category (e.g., "unacceptable risk" 1308*a*, "high risk" 1308*b*, "limited risk" 1308*c*, and "minimal risk" 1308*d*) in risk categories 1308 provide the standards that the model use case 1302 must meet, and any gaps 1312 between the criteria 1310 and the models'performance can be identified by the system (e.g., compliance engine 1304, compliance engine 1214 in FIG. 12). Risk categories can include risks of various dimensions of the regulation such as data privacy risks, model bias risks, operational risks, depending on the guidelines (e.g., guidelines 1210 in FIG. 12) used. Each risk category 1308 can be associated with specific risk factors and metrics that are used by models 1306 to evaluate the level of risk of the model use case 1302. For example, data privacy risks can be assessed based on the sensitivity of the data used by the model, while model bias risks can be evaluated based on the fairness and equity of the model's predictions.

Criteria 1310 are the specific requirements or standards that the model use case 1302 must meet. Criteria 1310 ensures that the model use case 1302 operates within acceptable parameters and adhere to regulatory, ethical, and performance standards. Criteria 1310 can include various technical and non-technical requirements such as accuracy thresholds, data quality standards, ethical guidelines, and regulatory compliance requirements. For example, accuracy thresholds can specify the minimum acceptable accuracy for the model's predictions, while data quality standards can define the required quality and integrity of the data used by the model. Methods of evaluating model use case 1302 against the criteria 1310 are discussed with further reference to FIG. 14.

Gaps 1312 refer to the discrepancies or deviations between the expected criteria and the actual performance or characteristics of the model use case 1302, and can include any type of deficiencies, absent obligations, or absent requirements. Gaps 1312 can be identified through various methods discussed with reference to FIG. 14. Compliance actions 1314 are the steps taken to address the identified gaps and ensure that model use case 1302 meets the defined criteria. Compliance actions 1314 can include modifications to the model use case 1302, updates to the data, and/or changes in the operational processes. In some implementations, compliance actions 1314 can include various technical and non-technical measures such as retraining the model with new data, updating the model's algorithms, implementing data privacy controls, and conducting regular audits and reviews. For example, retraining a model in the model use case 1302 with new data can help to improve its accuracy and reduce bias, while implementing data privacy controls may help to protect the privacy and confidentiality of the data used by the model. Compliance actions, in some implementations, can be automatically executed using methods discussed with reference to FIG. 14.

The monitoring loop 1316 continuously observes the model use case 1302, updating and refining the model use case 1302 as needed to maintain compliance over time. Monitoring loop 1316 is the continuous process of observing, evaluating, and updating the AI models and their use cases, and can be the same as or similar to feedback loop 1222 with reference to FIG. 12. The monitoring loop 1316 ensures that the models remain compliant over time, adapting to new data, changing conditions, and evolving standards. For example, continuous performance monitoring using the monitoring loop 1316 can involve tracking the model use case's 1302 performance metrics in real-time and identifying any deviations from the expected criteria, or conducting periodic assessments at predefined intervals of the model use case's 1302 data, algorithms, and processes to ensure compliance with the defined criteria. In some implementations, the system can continuously scan for changes in regulations, or receive a regulation update from a user input. When a new regulation or regulatory update is identified, the system automatically updates the compliance criteria and maps (e.g., associates, links) the new criteria to the specific AI use cases, updating the existing compliance rules and parameters using methods discussed with reference to FIG. 14.

Figure 14:
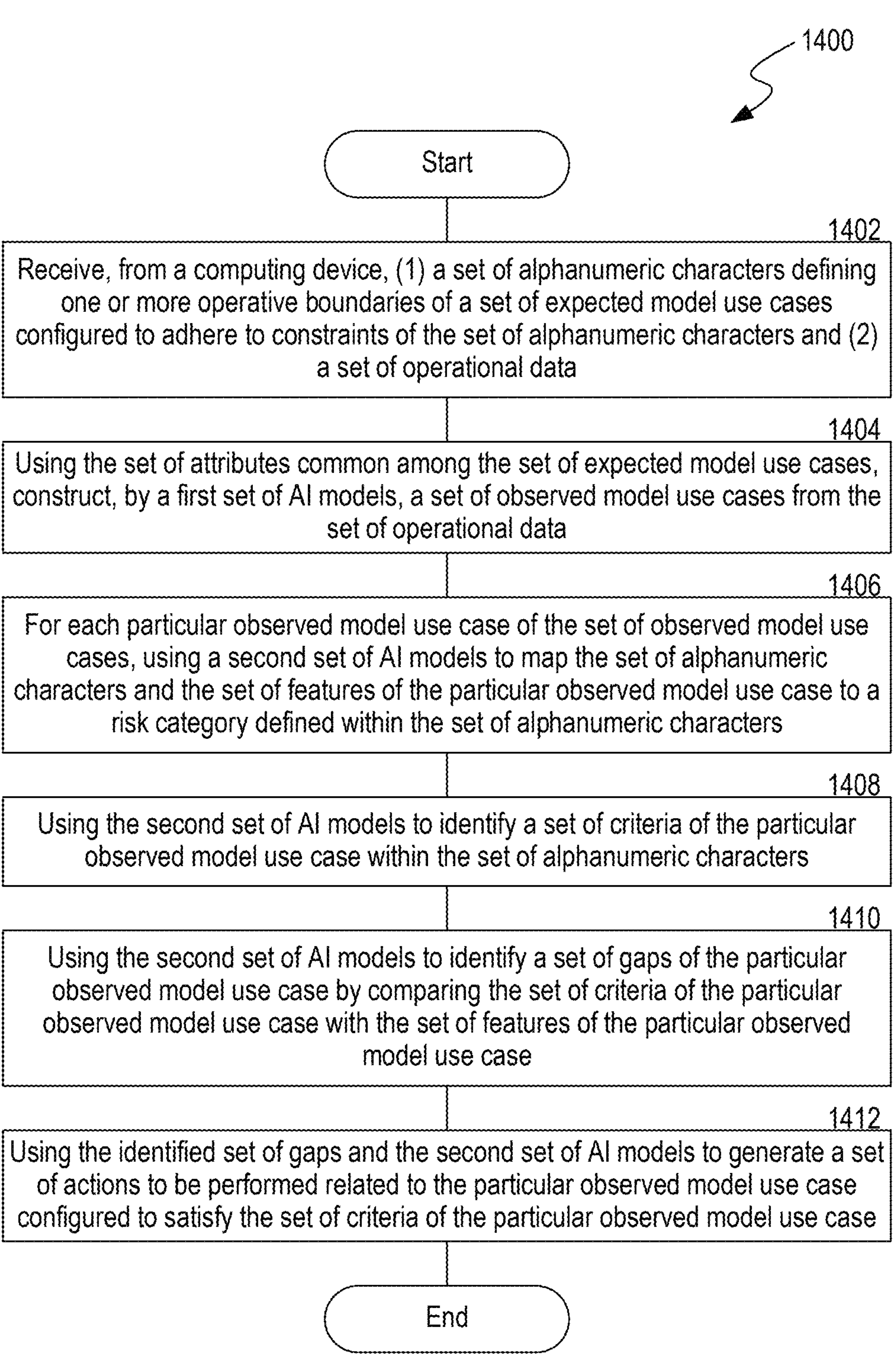
FIG. 14 is a flow diagram illustrating a process of identifying and remediating gaps in compliance for AI use cases using a generative AI model, in accordance with some implementations of the present technology.

FIG. 14 is a flow diagram illustrating a process 1400 of identifying and remediating gaps in compliance for AI use cases using a generative AI model, in accordance with some implementations of the present technology. In some implementations, the process 1400 is performed by components of example devices 200 and computing devices 302 illustrated and described in more detail with reference to FIG. 2 and FIG. 3, respectively. Particular entities, for example, the sets of AI models, are illustrated and described in more detail with reference to FIG. 12 and FIG. 13. Likewise, implementations can include different and/or additional steps or can perform the steps in different orders.

In operation 1402, the system (e.g., compliance engine 1214 in FIG. 12, compliance engine 1304 in FIG. 13) receives, from a computing device, (1) a set of alphanumeric characters (e.g., regulations, guidelines) defining one or more operative boundaries of a set of expected model use cases configured to adhere to constraints of the set of alphanumeric characters and (2) a set of operational data containing one or more of: structured data or unstructured data. The set of operational data can include data from, for example, third-party tools (e.g., downstream suppliers).

The set of expected model use cases can be, for example, "AI system" as defined in the regulations, such as the EU AI Act, California SB-1047, and/or guidelines 1210 in FIG. 12. The regulations alphanumeric characters represent the specific regulatory requirements or guidelines for the AI models in the model use case. By receiving the inputs, the compliance engine can evaluate the AI models against the defined constraints, ensuring that the model use case adheres to the regulatory standards. The operational data, which can be structured (e.g., databases, spreadsheets) or unstructured (e.g., text, images), provides the context for assessing the models'performance and compliance. For operational structured data, the system can convert data types and remove missing values, while for unstructured data, NLP for text data or image preprocessing for visual data can be employed. The compliance engine can translate alphanumeric characters representing regulatory guidelines into actionable rules and constraints using methods discussed in FIG. 8, and subsequently map the actionable rules to portions of the model use case. For example, the EU AI Act can require documentation of data governance practices, which can be mapped to specific data handling and storage requirements within the model use case.

The set of expected model use cases can include a set of attributes common among each expected model use case in the set of expected model use cases. The set of attributes can include characteristics that define "AI system" in the regulations, such as those outlined in the EU AI Act, or "covered model" in California SB-1047, and so forth. For example, for a regulation defining "AI system" as "systems designed to operate with a degree of autonomy and that can generate outputs such as content, predictions, recommendations, or decisions influencing real or virtual environments," the set of attributes can include autonomy, output generation, data governance, algorithmic transparency, risk management, human oversight, ethical considerations, and/or compliance documentation.

Using the set of attributes common among the set of expected model use cases in operation 1404, the system constructs, by a first set of AI models, a set of observed model use cases (e.g., an inventory) from the set of operational data. Each particular observed model use case of the set of observed model use cases can include a set of features of the particular observed model use case. The set of features of the particular observed model use case can include, for example, a text-based description of the particular observed model use case, an expected input of the particular observed model use case, an expected output of the particular observed model use case, one or more AI models configured to generate the expected output of the particular observed model use case using the expected input of the particular observed model use case, and/or data supporting the one or more AI models.

To obtain the set of observed model use cases from the operational data, the system can review an existing (e.g., internal) set of explicit and implicit definitions of AI, machine learning, and/or generative AI, and compare the definitions with: (1) definitions provided by a particular regulatory regime, such as the EU AI Act and California SB-1047, and/or (2) other regulations in the absence of a definition, such as the GDPR, NIST, and the OECD. The system can, in some implementations, identify definitional gaps and generate recommendations (or automatically executed actions) to remediate the definitional gaps by aligning the organizational definitions with the regulatory definitions using methods discussed with reference to FIGS. 5-8.

In some cases, the implementations can receive a structured AI use case input and determine applicable predefined regulations of the AI use case using rule-based systems and/or one or more AI models. The relevant regulations can be specifically selected based on the context and requirements of the AI use case being evaluated. The system analyzes metadata tags, keywords, or categories associated with the regulations stored in its database and uses NLP to parse the text of the regulations, identifying terms and clauses relevant to the AI application's domain. Regulations can be stored in vector space, allowing the system to calculate the similarity between vectors representing domain-specific terms and other related terms, applying a similarity threshold to filter out insufficiently similar terms. Additionally, the system tags relevant regulations with attributes that categorize the regulations based on criteria such as regulatory topics or jurisdictional relevance.

When processing unstructured data such as text documents, emails, or social media posts, the system can extract relevant operational data that aligns with the set of attributes, such as autonomy or output generation. For example, autonomy-related data can be identified by looking for phrases indicating independent operation, while output generation data can be extracted by identifying mentions of content creation, predictions, or recommendations. Once the relevant data is extracted, the operational data can be mapped to the regulatory attributes and organized into a structured model use case. Each use case can include descriptions of the data sources, algorithms, or other features of the model(s) used.

In some implementations, the system identifies, using a third set of AI models (which can be the same as or different from the first set of AI models and/or the second set of AI models), a portion of the set of observed model use cases. The third set of AI models can, for example, perform a Retrieval-Augmented Generation (RAG) search of the operational data using the set of attributes. During training, the third set of AI models learn to retrieve relevant information from a large dataset based on the input attributes and generate meaningful responses or insights. The retrieval component of the RAG model searches the operational data to find relevant model use cases that match the input attributes (e.g., type of model used, location, user type) using techniques such as vector similarity search, where the attributes are converted into vector representations, and the model searches for similar vectors within the dataset. The generation component uses the retrieved information to generate a contextually relevant output, which can be an identification of a portion of the observed model use cases.

For each particular observed model use case of the set of observed model use cases, in operation 1406, the system uses a second set of AI models (which can be the same as or different from the first set of models) to map the set of alphanumeric characters and the set of features of the particular observed model use case to a risk category defined within the set of alphanumeric characters. The second set of AI models can select the risk category from a plurality of risk categories defined within the set of alphanumeric characters in accordance with a level of risk associated with the set of features. For example, the second set of AI models can be trained on a dataset that includes both regulatory text and features of various model use cases, along with their corresponding risk categories. During training, the second set of AI models learn to recognize patterns and relationships between the regulatory requirements (which can be expressed as vector representations) and the features of the model use cases (which can be expressed as vector representations).

In some implementations, the set of alphanumeric characters can be converted into vector representations using text embedding techniques such as Word2Vec, GloVe, or BERT to capture the semantic and contextual meaning of the regulations while transforming them into numerical vectors. In some implementations, the features of the observed model use case, such as data quality, algorithmic transparency, and potential biases, are also converted into numerical vectors using similar methods. Once both the regulatory text and the model use case features are represented as vectors, the vectors are combined into a unified feature space. The second set of AI models can evaluate the combined vector against learned patterns and relationships within the second set of AI models' training data, assigning a risk category based on the alignment between the regulatory requirements and the observed model use case features. In some implementations, the second set of AI models identifies a mapping between the set of features of the particular observed model use case and the set of vector representations of the set of alphanumeric characters using a distance between a set of words within the set of features of the particular observed model use case and respective mapped alphanumeric characters within the set of alphanumeric characters. A distance metric can be used to calculate the similarity or dissimilarity between the vectors. For example, Euclidean distance measures the straight-line distance between two points in a vector space, cosine similarity measures the cosine of the angle between two vectors, and Manhattan distance measures the sum of the absolute differences between the coordinates of two points. The calculated distances help identify the mapping between the features of the model use case and the regulatory text. Features that are closer in the vector space to specific regulatory requirements indicate a stronger alignment. For example, if a feature vector representing "data encryption" is close to a regulatory vector emphasizing "data security," this indicates a strong alignment.

In some implementations, the second set of AI models, which can be the same as or different from the first set of AI models, can generate a risk score for each observed model use case. This risk score can be used to categorize the use case into one of the predefined risk categories, such as low, medium, or high risk. For example, a use case with high data quality, transparent algorithms, minimal biases, and low decision-making impact can be categorized as low risk. Conversely, a use case with poor data quality, opaque algorithms, significant biases, and high decision-making impact can be categorized as high risk. To generate a risk score, the system can use a multi-agent architecture within the second set of AI models, where different agents (i.e., model(s)) are specialized in evaluating specific risk factors such as data quality, algorithmic transparency, and potential biases. Each agent independently assesses the assigned factor and generates a partial risk score. The partial scores are aggregated to form an overall risk score for the use case. In some implementations, the system uses an ensemble method, such as averaging the scores from multiple models. In some implementations, the system generates initial risk scores using simpler models and refines the risk score using more complex models. For example, a basic decision tree can first categorize the model use case into broad risk categories, which are fine-tuned by a neural network that considers more nuanced factors (e.g., factors specific to the regulation). In some implementations, the multi-agent architecture is similarly used by the first set of AI models to construct the set of observed model use cases.

In operation 1408, for each particular observed model use case of the set of observed model use cases, the system uses the second set of AI models (or by user input) to identify a set of criteria of the particular observed model use case within the set of alphanumeric characters. The system extracts a set of keywords from the set of alphanumeric characters. The system can map the extracted set of keywords to the set of criteria within the set of alphanumeric characters associated with the mapped risk category. The system can search the set of alphanumeric characters for sentences or phrases that contain the identified keywords and extracting the relevant information. For example, if the keyword "encryption" is identified, the system searches for sentences that mention "encryption" and extracts the criteria related to data encryption. Additionally, using the identified criteria, the system can compare different model use cases to determine whether certain model use cases pose a lower risk than others.

After extracting the criteria, the system can associate and map them with the specific risk category. The system can use one or more models trained on labeled datasets where each criterion is tagged with its corresponding risk category. These models, which can include logistic regression, SVM, or neural networks, can be trained to recognize patterns and relationships between the criteria and risk categories. During the training phase, the models learn to identify which criteria are indicative of specific risk levels. For instance, the model learns that "data encryption," "multi-factor authentication," and "regular audits" are indicative of a "High Risk" category, while "basic password protection" and "firewall implementation" are associated with "Medium Risk," and "antivirus software" is linked to "Low Risk." Once trained, the models can be deployed to automatically classify new criteria into the appropriate risk categories.

In operation 1410, for each particular observed model use case of the set of observed model use cases, the system uses the second set of AI models to identify a set of gaps of the particular observed model use case by comparing the set of criteria of the particular observed model use case with the set of features of the particular observed model use case. A gap is identified when the features do not fully meet the criteria, indicating a potential compliance or performance issue. For example, if the criteria require "data encryption" and "multi-factor authentication," but the operational data within the model use case only include "basic password protection," the second set of AI models can flag this as a gap. Methods of identifying a gap are discussed with reference to FIGS. 6-8.

In some implementations, the system determines, for each gap in the set of gaps, a type of gap between the set of criteria of the particular observed model use case and the set of features of the particular observed model use case. The type of gap can be associated with one or more of: a presence of a particular set of alphanumeric characters of the particular observed model use case or a semantic meaning of one or more sets of alphanumeric characters of the particular observed model use case. The system can, using the type of difference, classify each gap in the set of gaps. In some implementations, the system triggers one or more alarms in response to the classification of a particular gap in the set of gaps reaching a predetermined threshold.

In operation 1412, using the identified set of gaps, the system generates a set of actions to be performed related to the particular observed model use case configured to satisfy the set of criteria of the particular observed model use case. In some implementations, the system validates, using a third set of AI models, satisfaction of the set of actions with the set of criteria of the particular observed model use case.

In some implementations, the system, using the generated set of actions, automatically triggers an automated workflow indicated by the generated set of actions to execute the generated set of actions. In some implementations, the system converts existing documentation (e.g., previously aggregated documentation) into new documentation that meets new regulatory requirements. For example, financial institutions are expected to comply with both MRM requirements and EU AI Act obligations, which differ in their risk rating methodologies. MRM takes a holistic view on risk classification (e.g., AI related to lending does not necessarily warrant a high-risk rating), while the EU AI Act adopts a use case-based categorical approach (e.g., all AI related to lending is high-risk with corresponding obligations even though there may be exceptions). The system can analyze existing documentation in conjunction with the text of relevant regulations to classify the risk category (while disregarding the preassigned risk rating provided by other regulations). Subsequently, the system utilizes the existing documentation to generate new documentation that complies with the updated regulatory requirements.

In some implementations, in generating and/or executing the set of actions, the system enables a set of agents to operate autonomously and make decisions and/or execute the set of actions based on programming, learned behavior, and/or suggestions from other models (e.g., AI models, LLMs, GenAI). For example, the agents use LLMs to ask for suggestions on what action to trigger and fetch the parameters for those actions. For example, a user may prompt the agent with a command that triggers the action of automatically adjusting a set of operational data to comply with a set of criteria of a regulatory category (e.g., a risk category) by remediating any identified gaps. The actions can be triggered by user queries as well as based on any operational data received by the first set of AI models and/or the second set of AI models.

To validate and govern the agents' actions to ensure that the agents do not take any unwanted or unapproved actions, the system can intercept and examine actions performed by an autonomous agent before execution and/or audits and logs the actions after execution. For example, the system can compare each intended action against a set of predefined rules and boundaries established by human operators (e.g., through a set of prompts, pre-loaded query context). If an action falls outside of the boundaries, the action can be flagged as unauthorized, and the system prevents the execution of the action. In some implementations, the system validates that all actions taken by the agent adhere to industry-specific standards, legal regulations, and ethical guidelines. The system can cross-reference actions with a database (e.g., static database, dynamic database) that includes the agent's permissible actions. The system can, in some implementations, use one or more LLMs (or a voting mechanism between multiple LLMs) to ensure that the agent's actions are fair, unbiased, and/or aligned with ethical standards. For example, rather than relying on a single algorithm, the system can query multiple LLMs to evaluate the proposed action. If the majority of the LLMs agree that the action is appropriate and free from bias, the action can proceed. If there is disagreement or a potential bias is detected, the unit can either automatically adjust the action or flag the action for human review. The system can generate reports that summarize the agent's compliance status, unauthorized actions prevented, and any bias corrections made.

In some implementations, for each particular observed model use case of the set of observed model use cases, the system maps each particular observed system asset to a first timestamp indicating an effective date of the set of alphanumeric characters, a second timestamp indicating when the particular observed system asset was determined, and so forth (e.g., for auditing purposes). Using a fourth set of AI models (which can be the same as or different from the first, second, and/or third set of AI models), the system can aggregate a set of documents associated with the particular observed system asset, where the set of documents satisfies the set of criteria corresponding to the mapped information assets, and wherein the metadata of the set of documents include the first timestamp, the second timestamp, a third timestamp indicating when the set of documents was aggregated, and so forth. In some implementations, the system versions (e.g., assigns a version) and/or appends timestamps onto one or more of the classifications of the observed model use cases, the set of alphanumeric characters, the operational data, and so forth. For example, each version of the classification, such as Version A, can be dated (e.g., Version A, dated September 2030) and includes a detailed classification of the observed model use case. This classification can be accompanied by an explanation of the particular subset of the set of alphanumeric characters used to classify the observed model use case, (thus enabling users to trace the system's decision-making process). The explanation can include, in some implementations, the underlying instructions (e.g., queries, prompts, assumptions, operational data, metadata appended to the operational data, pre-loaded query context) used by the model(s) (e.g., the first set of AI models, the second set of AI models, the third set of AI models). In some implementations, the explanation defines the set of parameters used by one or more AI models of at least one of: the first set of AI models or the second set of AI models to generate one or more of: the risk category, the set of criteria, or the set of gaps of the particular observed model use case.

For instance, if an observed model use case is classified under a high-risk category, the system can document one or more of: (i) the classification (e.g., high-risk), (ii) an explanation of the classification (e.g., the definition of "high risk" in the regulation, the specific rules and criteria within the regulation that led to the classification), or (iii) the underlying assumptions taken by one or more models used to classify the observed model use case (e.g., the interpretation of the regulation as of a particular date). The documentation can include, for example, the prompts used by the AI model(s) to interpret the regulatory texts and map the compliance criteria to the observed model use case. By maintaining a versioned record of the classifications, the system ensures that each decision is traceable and can be audited at any time to verify that the system's classifications are consistent with the latest regulatory requirements and standards.

The system can construct and store a set of versioned documents for each observed model use case, which can include the mapped timestamp and/or the versioned classification. The documents can be aggregated and stored in a centralized repository. For example, the set of documents includes reports on the compliance criteria, the risk category, and/or the specific actions taken to address any identified compliance gaps. Each document of the set of documents can be appended with a version and/or timestamp as discussed above.

For each particular observed model use case of the set of observed model use cases, the system can generate for display on the computing device, a layout indicating the aggregated set of documents. For example, the layout includes a first representation of the particular observed model use case model use case and a second representation of the corresponding documents in the aggregated set of documents.

In some implementations, the system monitors each particular observed model use case of the set of observed model use cases for deviations from the set of criteria of the particular observed model use case, in accordance with predetermined intervals. Responsive to detecting a set of deviations, the system can automatically update the set of gaps. The system can, using the updated set of gaps, generate a set of actions of the observed model use cases configured to satisfy the set of criteria of the observed model use cases. In some implementations, using the generated set of actions, the system automatically triggers an automated workflow indicated by the generated set of actions to execute the generated set of actions. The system can track compliance with a particular regulation externally and internally. For example, externally, the system monitors required statements or documentation that the Act requires AI providers to issue. Internally, the system can identify new gaps from automatically refreshed assessments and generate an alert based on the gap (e.g., generating an exceptional trigger for potential "Prohibited" or "High-Risk" AI use cases).

In some implementations, the set of attributes is a set of expected attributes and the set of actions is a first set of actions. The system can compare the set of expected attributes common among each expected model use case in the set of expected model use cases with a set of observed attributes defining one or more observed model use cases in the set of observed model use cases. Responsive to one or more attributes in the set of expected attributes being absent from the set of observed attributes, using the set of expected attributes, the system can generate a second set of actions configured to add the one or more attributes in the set of expected attributes absent from the set of observed attributes to the set of observed attributes.

In some implementations, the set of gaps is a first set of gaps. The system can, for each particular observed model use case of the set of observed model use cases, map each particular observed model use case to a timestamp (e.g., a timestamp of the effective set of alphanumeric characters and/or a timestamp when the particular observed model use case was constructed). Using a third set of AI models, the system can aggregate a first set of documents associated with the particular observed model use case, where the first set of documents satisfies the set of criteria corresponding to the mapped risk category. The system can provide a second set of documents associated with the particular observed model use case. The system can identify a second set of gaps by comparing the first set of documents with the second set of documents. The second set of gaps can include, for example, documents present in the first set of documents and absent in the second set of documents, and/or documents present in the second set of documents and absent in the first set of documents.

The system can, responsive to identifying the second set of gaps, automatically trigger execution of a set of corrective actions. The set of corrective actions can include adding the absent document within first set of documents to the second set of documents, modifying one or more documents in the second set of documents, removing one or more documents in the second set of documents, requesting, via the computing device, a set of additional features associated with a specific model use case, modifying the set of features of the specific model use case, and/or adjusting at least one parameter of one or more AI models of the first and/or second set of AI models.

Managing Operational Resilience Using the Data Generation Platform

Figure 15:
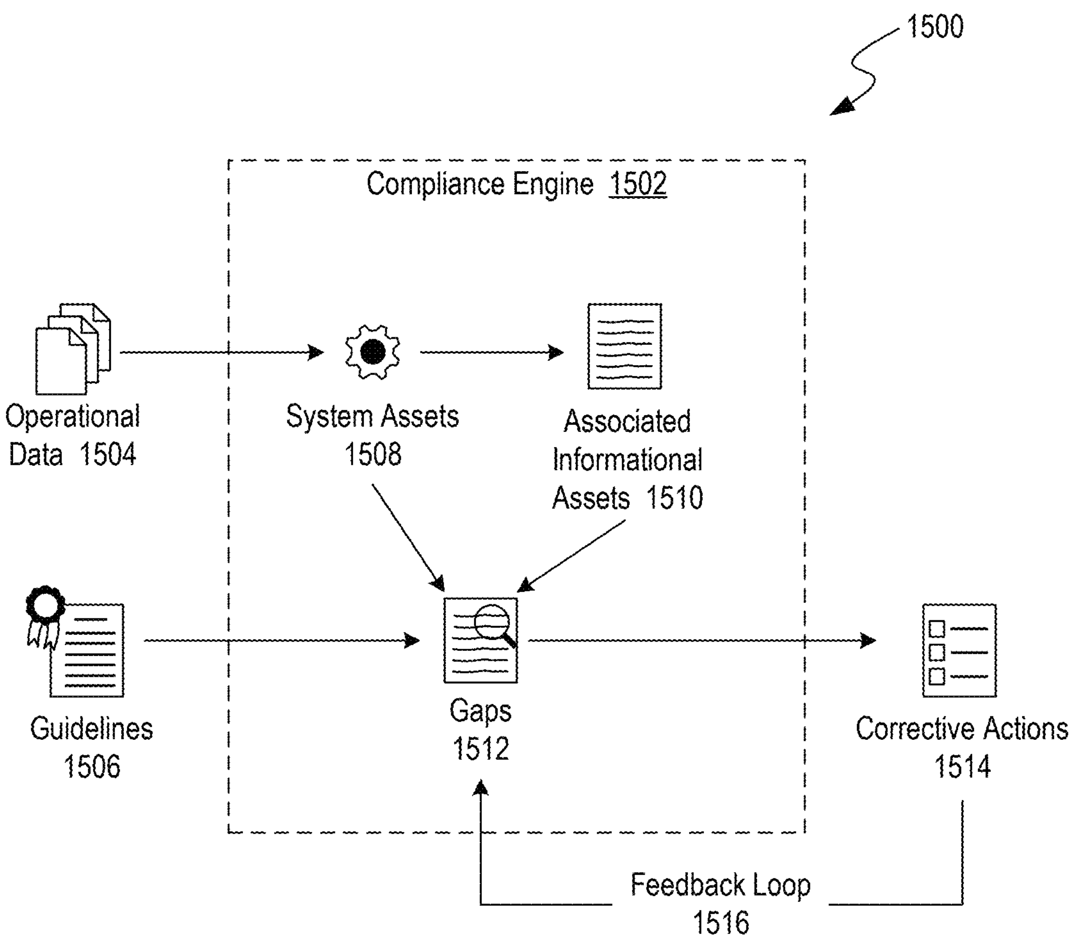
FIG. 15 is a block diagram illustrating an example environment for continuously monitoring compliance of network and information systems using an AI model, in accordance with some implementations of the present technology.

FIG. 15 is a block diagram illustrating an example environment 1500 for continuously monitoring compliance of network and information systems using an AI model, in accordance with some implementations of the present technology. Environment 1500 includes compliance engine 1502, operational data 1504, guidelines 1506, system assets 1508, associated informational assets 1510, gaps 1512, corrective actions 1514, and feedback loop 1516. The compliance engine 1502 can be implemented using components of example devices 200 and computing devices 302 illustrated and described in more detail with reference to FIG. 2 and FIG. 3, respectively. Implementations of example environment 1500 can include different and/or additional components or can be connected in different ways.

The compliance engine 1502 can be the same as or similar to compliance engine 1304 illustrated and described in more detail with reference to FIG. 13. The compliance engine 1502 intakes operational data 1504 from various system assets 1508. The operational data 1504 can be thought of as the set of data collected from various software and hardware assets within a network or information system (e.g., system assets 1508). For example, the operational data 1504 can be the same as or similar to operational data 1204 illustrated and described in more detail with reference to FIG. 12. The operational data 1504 can encompass a wide range of information, including but not limited to, the performance metrics, usage statistics, and/or status updates of the system assets 1508. Additionally, operational data 1504 can include data about the storage locations of informational assets and the transmission paths the informational assets take within the system assets 1508. The compliance can use one or more AI models described with reference to FIG. 18 to evaluate the operational data 1504 against the guidelines 1506. By analyzing operational data 1504, the compliance engine 1502 can identify patterns, detect anomalies, and evaluate the overall health and compliance status of the system assets 1508. The continuous influx of operational data 1504 ensures that the compliance engine 1502 has up-to-date information to make accurate and timely decisions regarding compliance (e.g., with cybersecurity standards such as the DORA) and operational resilience.

Through the evaluation, the compliance engine 1502 identifies gaps 1512 in compliance with, for example, guidelines 1506 such as DORA. The guidelines 1506 can be the same as or similar to guidelines 602, guidelines 802, guidelines 902, and guidelines 1210 illustrated and described in more detail with reference to FIG. 6, FIG. 8, FIG. 9, and FIG. 12, respectively. The guidelines 1506 can be thought of as the set of rules, standards, and policies that define the compliance requirements for network and information systems. For example, guidelines 1506 can include cybersecurity measures defined in regulations such as DORA to protect critical (e.g., as defined within the regulation) infrastructure and sensitive information. The guidelines 1506 can include criteria for data encryption, access controls, incident response procedures, and/or regular security audits. The compliance engine 1502 uses the guidelines 1506 as a benchmark to evaluate the compliance status of system assets 1508. Methods of identifying the criteria from the guidelines 1506 is discussed in further detail with reference to FIG. 18.

The system assets 1508 can include the hardware, software, and network components that are part of the information systems being monitored for compliance (e.g., ICT systems). The system assets 1508 include, for example, servers, databases, applications (e.g., AI applications), network devices, and any other infrastructure elements that contribute to the operation of the network and information systems. By analyzing the attributes and features of each system asset, such as their expected inputs, outputs, interdependencies, and/or supporting data (e.g., training data of the AI applications), the compliance engine 1502 can identify deviations from the compliance standards. From the system assets 1508, the compliance engine 1502 can identify the associated informational assets 1510 of the system assets 1508. The associated informational assets 1510 refer to the data and information that are transmitted, processed, or stored within the system assets 1508. The associated informational assets 1510 can include sensitive data (e.g., personal identifiable information (PII)), operational records, user information, and/or any other data that the system manages or facilitates. The compliance engine can associate the informational assets with corresponding system assets to identify where and how the data is managed within the network. The association (e.g., mapping) identifies the flow of information and ensuring that such processes adhere to the established guidelines 1506.

The gaps 1512 indicate areas where the system asset 1508 is not meeting the criteria within the guidelines 1506. The gaps 1512 can be the same as or similar to gaps 1312 illustrated and described in more detail with reference to FIG. 13. The compliance engine 1502 can suggest and/or automatically implement corrective actions 1514 to remediate the gaps 1512. The actions are implemented to bring the system assets 1508 back into compliance with the guidelines 1506. The corrective actions 1514 refer to the set of measures and interventions implemented to address identified gaps or deviations from compliance standards within the system assets 1508. The corrective actions 1514 can be triggered by the compliance engine 1502 upon detecting discrepancies between the current state of the system and the established guidelines 1506.

The corrective actions 1514 can include a variety of responses such as generating descriptions of training data (e.g., to comply with regulations such as California AB 2013) or other compliance documentation, updating or patching software, reconfiguring network settings, enhancing security protocols, and/or initiating additional training for personnel. In some cases, the corrective actions 1514 can include isolating affected system assets from the network to prevent further issues, logging detailed information about the identified gaps for future reference, and/or triggering alarms to alert relevant stakeholders. The corrective actions 1514 can restore compliance, mitigate risks, and/or enhance the overall security and operational resilience of the information systems. By systematically addressing the identified issues, organizations can ensure continuous adherence to cybersecurity standards and maintain the integrity and reliability of their network and information systems.

In some implementations, the corrective actions 1514 include relocating where data is stored and processed, moving where AI models are stored and processed, and/or changing the system assets used to store and process data to increase resilience. For example, the corrective actions 1514 can include executing backup solutions such as off-site data replication and/or cloud-based storage to ensure data availability in case of primary site failure. Further, the corrective actions 1514 can include deploying alternative power sources, such as uninterruptible power supplies (UPS) and other backup generators to maintain operations and remain compliant to the guidelines. Additional servers can be provisioned using the corrective actions 1514 to distribute workloads and prevent single points of failure. Further, the corrective actions 1514 can improve data center management practices (e.g., increased security measures for data, deploying automated monitoring tools).

The feedback loop 1516 can systemically collect data generated from the compliance engine 1502, including the results of compliance assessments, identified gaps, and/or indicators of the effectiveness of implemented corrective actions 1514. After corrective actions are implemented, the feedback loop 1516 can trigger a re-assessment of the affected system assets by executing the same compliance checks and assessments that initially identified the gaps. The results can be compared to the compliance guidelines 1506 to ensure that the deviations have been rectified. Metrics such as system uptime, incident frequency, and/or security breach attempts can be monitored to ensure that the corrective actions have not only addressed the compliance gaps but also improved the overall security posture.

Figure 16:
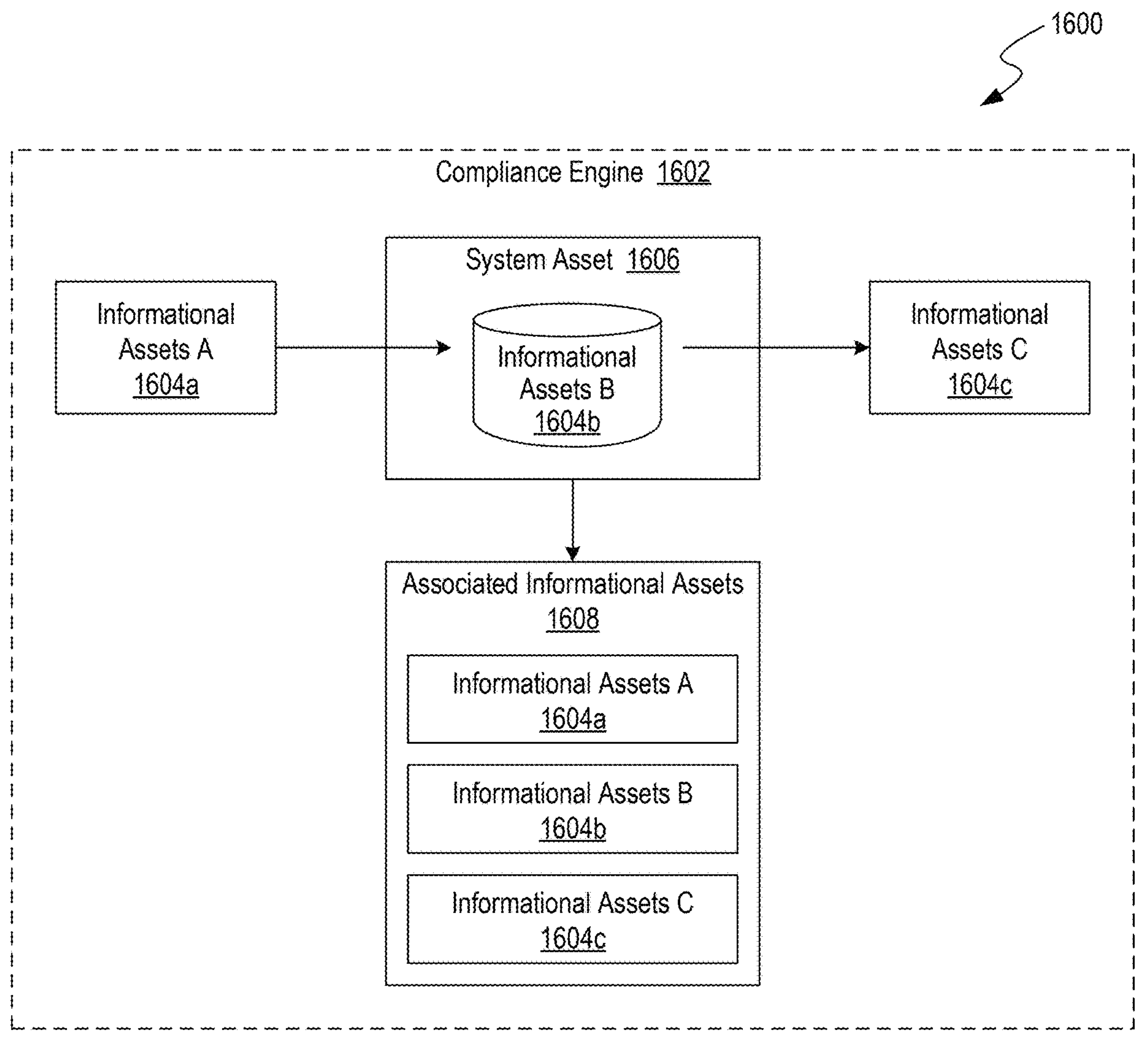
FIG. 16 is a block diagram illustrating an example environment for mapping information assets to information system assets using an AI model, in accordance with some implementations of the present technology.

FIG. 16 is a block diagram illustrating an example environment for associating (e.g., mapping) information assets with information system assets using an AI model, in accordance with some implementations of the present technology. Environment 1600 includes compliance engine 1602, informational assets 1604 (such as received informational assets 1604A, stored informational assets 1604C, and transmitted informational assets 1604C), system asset 1606, and associated informational assets 1608. The compliance engine 1502 can be the same as or similar to compliance engine 1502 illustrated and described in more detail with reference to FIG. 15. The system asset 1606 can be the same as or similar to system assets 1508 illustrated and described in more detail with reference to FIG. 15. The associated informational assets 1608 can be the same as or similar to the associated informational assets 1510 illustrated and described in more detail with reference to FIG. 15. Implementations of example environment 1600 can include different and/or additional components or can be connected in different ways.

The compliance engine 1602 can use one or more AI models to analyze and associates informational assets with system assets. The AI model associates the informational assets 1604 to the appropriate system assets 1606, creating associated informational assets 1608. The compliance engine 1602 checks the associated informational assets 1608 and the system assets 1606 against the compliance guidelines (e.g., guidelines 1506) to ensure adherence. For example, in the context of DORA, the AI model can identify and associate sensitive financial data (i.e., informational assets 1604) with the specific servers and databases (i.e., system assets 1606) that store and process the data.

The received informational assets 1604A can be thought of as the data that is incoming to the system from external sources. The received informational assets 1604A can include data such as training data of an AI application, pre-loaded query context of an AI application, emails, customer inquiries, transaction records, documents, portions of documents, and data feeds from third-party services. For example, in a financial institution, received informational assets can include real-time market data feeds, customer transaction requests, and compliance reports from regulatory bodies. The stored informational assets 1604B are data elements that are retained within the system asset 1606 for future use. The stored informational assets 1604B can include databases of customer information, historical transaction records, archived emails, and backup files. For instance, in the context of a financial institution, stored informational assets can encompass customer account details, transaction histories, and compliance documentation. The transmitted informational assets 1604C refer to data that is sent out from the system to external destinations. The transmitted informational assets 1604C can include outgoing emails, data shared with third-party vendors, transaction confirmations sent to customers, and regulatory filings. For example, in a financial institution, transmitted informational assets can include transaction confirmations sent to customers, data shared with payment processors, and compliance reports submitted to regulatory authorities. In FIG. 16, the association of received, stored, and transmitted informational assets to system asset 1606 ensures that all data flows are properly tracked and managed. Linking and/or associating the informational assets 1604 to the system asset 1606 ensures that data handling practices are transparent, traceable, and compliant with the guidelines.

Figure 17:
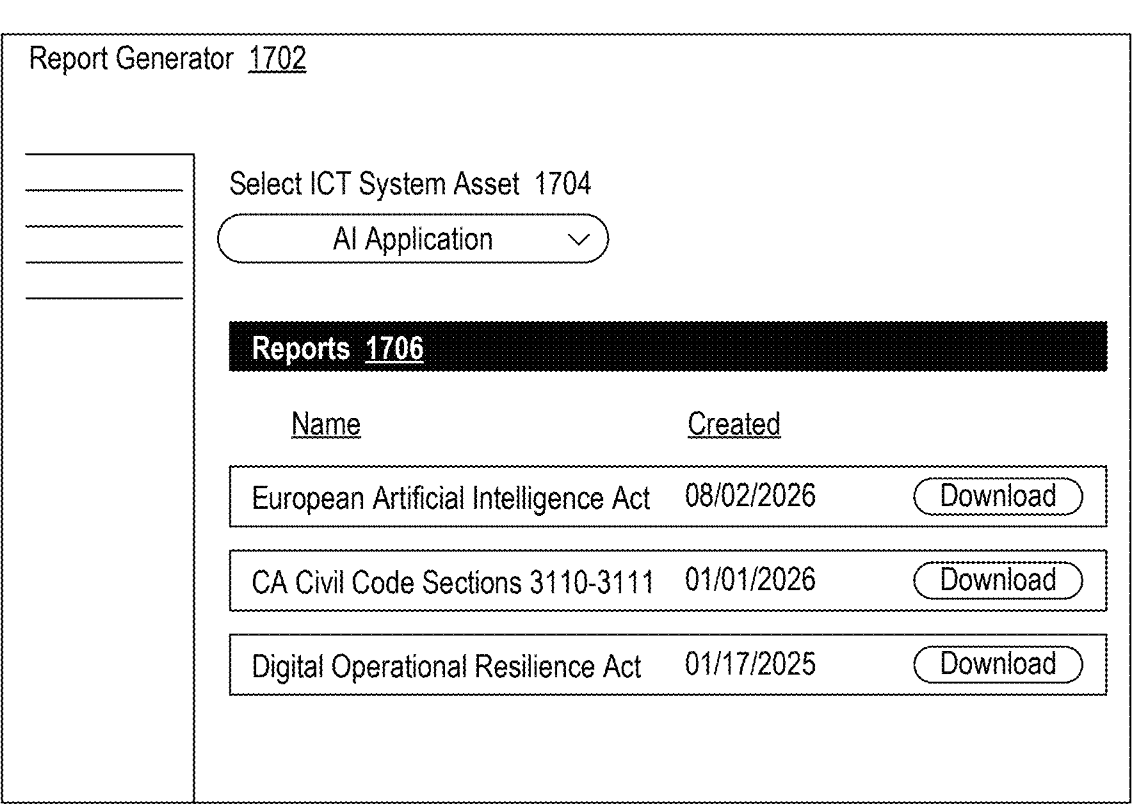
FIG. 17 is a block diagram illustrating an example interface for generating compliance documentation using an AI model, in accordance with some implementations of the present technology.

FIG. 17 is a block diagram illustrating an example interface 1700 for generating compliance documentation using an AI model, in accordance with some implementations of the present technology. The interface 1700 includes document generation engine 1702, selected system asset 1704, and reports 1706. Implementations of example interface 1700 can include different and/or additional components or can be connected in different ways.

The document generation engine 1702 generates compliance documentation (i.e., by aggregating existing documents or generating new documents) using the selected system assets 1704 and obtained guidelines. The interface 1700 can include an indicator (e.g., a button, a drop-down menu) to enable users to choose specific system assets for which compliance documentation is to be generated for. For example, the interface 1700 can be a graphical user interface (GUI) that enables users to visually navigate and select assets from a network diagram or asset inventory. FIG. 17, for example, includes an AI application as the selected ICT system asset 1704. In some implementations, the interface 1700 is communicatively connected (e.g., via an API) to asset management systems or configuration management databases (CMDBs) to automatically populate the list of available assets and ensure that the selection is always up-to-date. The reports 1706 displays the generated documents (e.g., compliance documentation). Users can view, download, and manage the compliance documentation from the interface 1700.

In some implementations, the reports 1706 can include version control (i.e., timestamping the time the report was created, the effective date and/or publish date of the regulation used to create the report, the date the system asset was identified by the data generation platform, and other timestamps) to enable users to track changes and updates to the compliance documentation over time. For example, in FIG. 17, the reports 1706 are generated with reference to various regulations such as the EU AI Act, California AB 2013, and the DORA, with specific dates indicating when the reports were created. For example, the California AB 2013 report 1706 can include a description of the training data of the AI application as required. In some implementations, the interface 1700 automatically generates new reports 1706 in response to newly input regulatory updates. Additionally or alternatively, in some implementations, the interface 1700 generates new reports at predetermined intervals. In some implementations, the document generation engine 1702 can generate a single report 1706 to comply with multiple guidelines (e.g., by combining the criteria of all guidelines). The compliance reports 1706 are created for third party services used by the organization.

Figure 18:
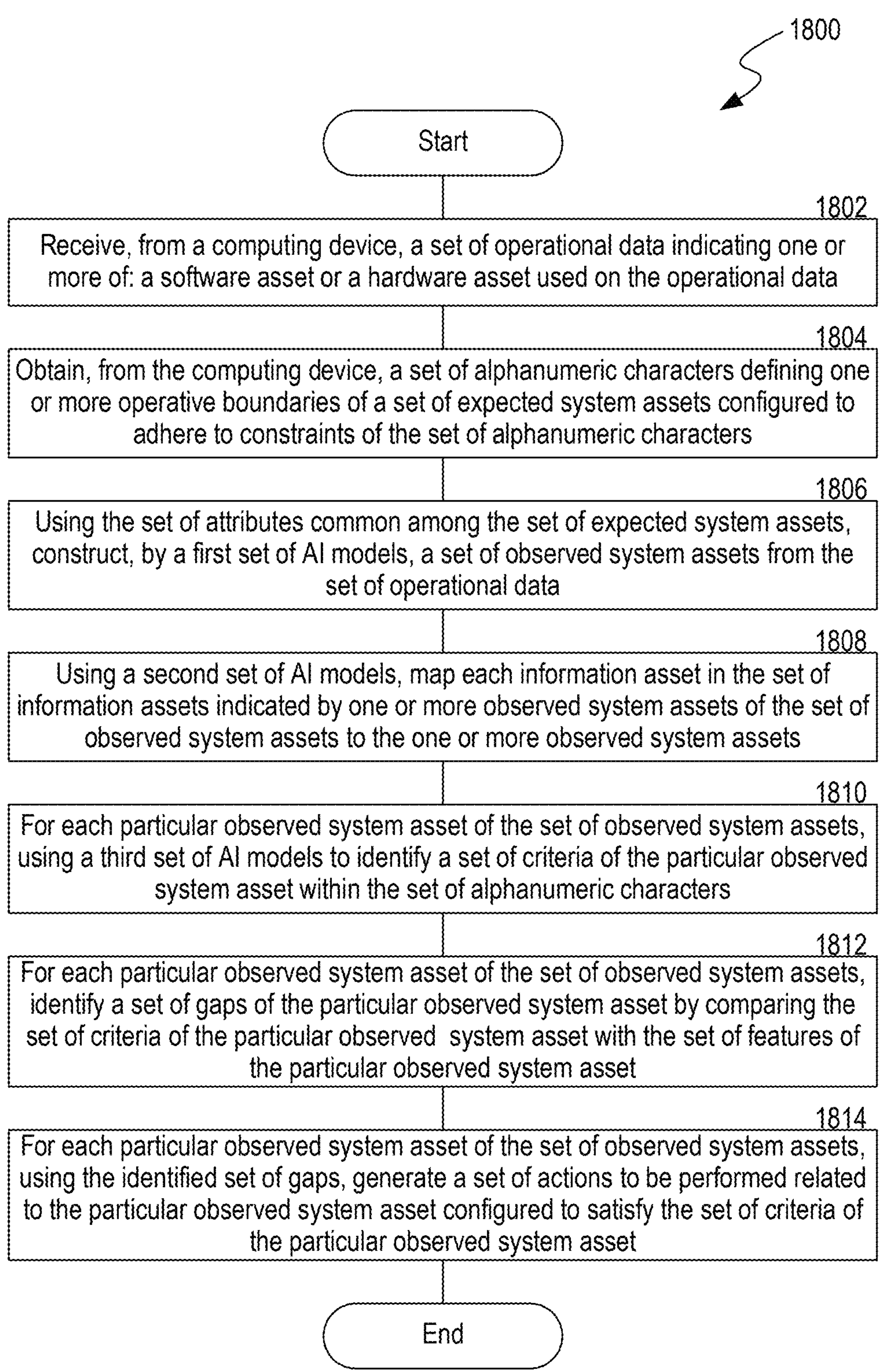
FIG. 18 is a flow diagram illustrating a process of managing operational resilience using an AI model, in accordance with some implementations of the present technology.

FIG. 18 is a flow diagram illustrating a process of managing operational resilience using an AI model, in accordance with some implementations of the present technology. In some implementations, the process 1800 is performed by components of example devices 200 and computing devices 302 illustrated and described in more detail with reference to FIG. 2 and FIG. 3, respectively. The process 1800 can be performed using one or more components or methods described in FIGS. 1-16. Specific models enumerated in the process 1800, such as the first, second, third, and/or fourth set of models, can be the same as or different from each other (e.g., the first and second can be same, the first and third can be same, the second and third can be same, and so forth). Implementations can include different and/or additional steps or can perform the steps in different orders.

In operation 1802, the system (e.g., the data generation platform 102) receives, from a computing device, a set of operational data (e.g., operational data 1504 in FIG. 15, operational data in FIG. 14) indicating a software asset and/or a hardware asset used on a set of informational assets within the set of operational data. In some implementations, the operational data can include metadata about the software and hardware assets, such as version numbers, configuration settings, operational logs, and/or performance metrics. For example, the operational data can include information about the software's patch level, the hardware's firmware version, and/or any recent changes to the system's configuration. In some implementations, the operational data can include information about the network topology, such as the connections between different hardware assets, the data flow between software components, and/or the overall architecture of the system. Additionally, the operational data can indicate the storage locations of the informational assets, such as databases, file servers, and/or cloud storage services. The operational data can include, in some implementations, data about the data transmission paths, such as the routes taken by data packets, the encryption methods used, and/or any intermediate nodes involved in the transmission.

In the context of testing compliance with regulations such as the DORA, the operational data can include information about assets of all categories as defined by the regulation. For example, in the context of DORA, the operational data can include both critical and non-critical information and communication technology assets as defined by the regulation. In another example, in the context of California AB 2013, the operational data can include details about the datasets employed to train the AI models, including the sources of the data, the types of data (e.g., text, images, audio), and/or preprocessing steps applied to the data before training. For example, the operational data can indicate that a particular AI model was trained using a dataset sourced from publicly available text corpora (which can then be accessed and summarized by the system to use as compliance documentation).

In operation 1804, the system obtains, from the computing device, a set of alphanumeric characters (e.g., cybersecurity regulations, industry standards, internal policies, guidelines 1506 in FIG. 15) defining one or more operative boundaries of a set of expected system assets configured to adhere to constraints of the set of alphanumeric characters. The set of expected system assets can include a set of attributes (e.g., type of asset, function, location, and security requirements) common among each expected system asset in the set of expected system assets. In some implementations, the set of alphanumeric characters can include configuration parameters, security policies, and operational guidelines that define the expected behavior and attributes of the system assets. For example, the alphanumeric characters can specify the required software versions, patch levels, and configuration settings for each system asset.

For example, in the context of DORA, an expected system asset can be a "critical" information and communication technology asset as defined by the DORA. Thus, the set of attributes can consider various factors such as the financial importance of the system, the volume of customers it serves, and/or the identified asset's substitutability. The set of attributes can cover other kinds of groupings, such as by domain (e.g., financial systems, healthcare systems) and/or by the definition of a system asset (e.g., servers, databases, network devices).

In operation 1806, using the set of attributes common among the set of expected system assets, the system determines, by a first set of AI models, a set of observed system assets (e.g., critical system assets as defined, system assets as defined) from the set of operational data. Each particular observed system asset of the set of observed system assets can include a set of features of the particular observed system asset. The set of features of the particular observed system asset can include a text-based description of the particular observed system asset, an expected input of the particular observed system asset, an expected output of the particular observed system asset, interdependencies of the particular observed system asset, and/or data supporting the system asset.

In some implementations, one or more AI models can be trained to recognize patterns and features that correspond to different types of ICT assets. For example, the models can be trained to identify database servers based on specific configuration settings and network traffic patterns, or to recognize application servers based on the types of requests they handle and their interactions with other system components. To identify what system assets are used in the operational data, the system can use NLP to analyze text-based descriptions and metadata, and/or pattern recognition to detect specific configurations and behaviors. The system can use NLP to extract information from configuration files and logs and identifying attributes such as the asset type, version, and role within the system. For example, the system can identify, within a configuration file, that a particular server is running a particular version of a database software and is designated as the primary database server for transaction processing. By identifying the attributes, the system can create an inventory of system assets, detailing their types, versions, and roles within the operational environment. In some implementations, pattern recognition algorithms can evaluate network traffic data to identify communication patterns that are characteristic of specific types of ICT assets. In some implementations, the system can use clustering algorithms to group similar assets based on their features and behaviors. For example, the system can cluster assets based on their network traffic patterns (e.g., which can be an attribute in the set of attributes), identifying groups of servers that handle similar types of requests or that communicate with the same set of clients to identify system assets and their interdependencies.

To identify a particular risk category of system assets (e.g., "critical" system assets in DORA) from the operational data, the system can use a rule-based engine including predefined criteria for criticality (e.g., extracted from the guidelines), such as the asset's role in the system, the volume of data it handles, and its impact on business operations. For example, a database server that stores customer data can be classified as critical based on its role and the sensitivity of the data it handles. In some implementations, the system can use one or more AI models trained to recognize system assets satisfying the criteria by identify features/patterns indicative of the particular risk category, such as availability requirements, and/or access by other system components above a certain threshold/frequency. In some implementations, the system monitors network traffic and identify assets that exhibit unusual patterns of communication or that handle a disproportionately large volume of requests. These anomalies can indicate that the asset should be monitored and included within the inventory, and thus part of the observed system assets.

In some implementations, the system identifies, using the third set of AI models, a portion of the set of observed system assets. The third set of AI models can be configured to perform a RAG search of the operational data using the set of attributes. The retrieval component of the RAG model can search through the operational data to identify patterns and features that match the expected attributes of the system assets (e.g., searching through logs, configuration files, network traffic data, and other sources of operational data). The generation component of the RAG model can use the retrieved information to generate text-based descriptions of the assets, summarizing their roles and functions, and identifying their interdependencies with other system components. In some implementations, the system can use alternative AI models such as transformer-based models (e.g., BERT, GPT) to perform the search and identification process. The models can be fine-tuned on the specific domain of operational data. For example, a transformer-based model can be trained to recognize specific terminology and patterns related to critical ICT assets. Additionally, the system can use graph-based models to represent the relationships and interdependencies between different system assets. In this approach, the operational data can be represented as a graph, with nodes representing the system assets and edges representing the relationships between them. The graph-based model can then use the structure of the graph to identify clusters of related assets and determine their roles/dependencies.

In operation 1808, using a second set of AI models(which can be the same as or different from the first set of models), the system can associate each information asset in the set of information assets indicated by one or more observed system assets of the set of observed system assets with the one or more observed system assets. In some implementations, the second set of AI models can use NLP on text-based descriptions and metadata associated with both information assets and system assets to identify which information assets are used by specific system assets. For example, the models can analyze information assets such as configuration files, log entries, and documentation to determine that a particular database server (system asset) is used to store customer records (information asset). In some implementations, the system can use clustering algorithms to group related assets based on their usage patterns, network traffic, and access logs. By identifying clusters of assets that frequently interact with each other, the system can infer which information assets are associated with specific system assets. For example, if a web server (system asset) frequently accesses a particular set of files (information assets), the system can associate these files to the web server. Additionally, the system can use graph-based models to represent the relationships between information assets and system assets. In this approach, the operational data can be represented as a graph, with nodes representing both information assets and system assets, and edges representing the interactions and dependencies between them. For example, the model can identify that a particular application server (system asset) has dependencies on multiple databases (information assets) based on the connections and data flows represented in the graph. In some implementations, the system can use supervised learning techniques to train the AI models on labeled data, that can include examples of how different types of system assets use specific information assets. For example, the training data can include examples of how different types of servers (system assets) access various types of data (information assets), enabling the models to accurately link the relationships in the operational data.

In some implementations, the system can use context-aware AI models (e.g., with pre-loaded query context) that take into account the specific operational context of the organization. The models can consider factors such as the organization's business processes, regulatory requirements, and security policies when linking and/or associating information assets to system assets. For example, for a financial institution, the models can assign a greater bias (i.e., more risk averse, fewer false negatives) when associating customer transaction data (information asset) with transaction processing systems (system assets) due to the important nature of these assets in the organization's operations.

In operation 1810, for each particular observed system asset of the set of observed system assets, the system can use a third set of AI models (which can be the same as or different from the first and/or second set of AI models) to identify a set of criteria of the particular observed system asset within the set of alphanumeric characters using methods discussed with reference to operation 1408 in FIG. 14. In some implementations, the system can extract a set of keywords from the alphanumeric characters, and map the extracted set of keywords to the set of criteria within the alphanumeric characters associated with the associated information assets. For example, the models can extract keywords such as "encryption," "access control," "audit logging," and "data retention" from the compliance guidelines. To improve the accuracy of keyword extraction, the system can use NLP techniques such as named entity recognition (NER) and part-of-speech (POS) tagging. NER can identify specific entities such as software names, regulatory bodies, and technical terms, while POS tagging can identify the grammatical structure of the text. In some implementations, the system can use topic modeling techniques such as Latent Dirichlet Allocation (LDA) to identify the main topics and themes within the set of alphanumeric characters. Topic modeling can group related keywords and phrases into coherent topics to use as the criteria. For example, LDA can identify topics related to "data security," "user authentication," and "system monitoring," each associated with a set of relevant keywords.

In some implementations, the system extracts criteria by identifying and documenting specialized requirements for system assets. For example, the system can identify the location of primary system assets, backup system assets, and/or disaster recovery system assets. Further, the system can identify the operational availability of system assets (e.g., uptime percentages, mean time between failures), response times (e.g., to customers by measuring latency metrics, transaction processing times, and so forth), accuracy of responses, location of data, and so forth.

In some implementations, the system can use rule-based approaches to define the association between keywords and criteria. For example, predefined rules can specify that any observed system asset with features related to "data storage" must meet criteria related to "encryption" and "access control." These rules can be based on industry standards, regulatory requirements, and best practices. In some implementations, the system can use graph-based models to represent the relationships between keywords, criteria, and system assets. In this approach, the keywords and criteria can be represented as nodes in a graph, with edges representing the relationships between them. For example, the model can identify a subgraph where nodes representing "encryption" and "data security" are closely connected to nodes representing database servers, indicating a strong association between these criteria and the observed system assets. In some implementations, to link the criteria of the guidelines to the specific observed ICT system asset, the system itself can be linked to other software or systems that measure or monitor ICT system assets. For example, the AI model can receive as inputs classifications, definitions, data, operational information, and/or outcomes of other systems, software, or sensors.

In operation 1812, the system can identify a set of gaps (e.g., non-compliance) of the particular observed system asset by comparing the set of criteria of the particular observed system asset with the set of features of the particular observed system asset. Methods of identifying gaps are the same as or similar to identifying gaps 1312. The second set of AI models can identify an association between the set of features of the particular observed system asset and the set of vector representations of the criteria using a distance between a vector representation of the set of features of the particular observed system asset and respective mapped alphanumeric characters of the criteria. For example, the system can use embedding-based models to convert both the features of the observed system assets and the respective alphanumeric characters (e.g., compliance guidelines) into high-dimensional vector representations. The system can use pre-trained language models such as BERT or GPT to generate embeddings for text-based descriptions of the observed system assets and the compliance guidelines. The embeddings can then be fine-tuned on domain-specific data for the specific context of the organization. Once the embeddings are generated, the system can use distance metrics such as cosine similarity, Euclidean distance, or Manhattan distance to measure the similarity between the vector representations of the observed system assets and the compliance guidelines. For example, the system can calculate the cosine similarity between the embedding of a database server's features and the embedding of a guideline that specifies encryption requirements for data storage. A high similarity score can indicate that the database server's features closely match the compliance guideline, while a low similarity score would indicate a potential gap in compliance. In some implementations, the system can use attention mechanisms to weigh the importance of different features and guidelines, allowing the AI models to prioritize certain aspects of the comparison. For example, the system can use an attention mechanism to prioritize the encryption-related features of a database server when comparing it to a guideline that emphasizes data security.

In some implementations, the set of gaps is a first set of gaps. The system can, for each particular observed system asset of the set of observed system assets, using a fourth set of AI models (which can be the same as or different from the first, second, and/or third set of AI models), aggregate a set of documents (e.g., compliance documentation) associated with the particular observed system asset in accordance with the identified criteria. The set of documents can satisfy the set of criteria corresponding to the associated information assets. For example, given the criteria of California AB 2013 requiring documentation of an AI application's training data, the system can use metadata in the operational data (e.g., dataset names, file paths, database references, timestamps, preprocessing steps applied to the data) to trace the data lineage and associate the operational data to the corresponding training datasets. For example, the system can follow file paths, query databases, and/or access cloud storage services as indicated by the operational data. Once the storage locations are identified, the training data can be retrieved. A set of AI models can create the set of documents (or aggregate existing documents) based on the criteria. For example, if the criteria includes keywords such as "number of data points" or "pre-processing description," the system can query, for example, an LLM, to output the compliance documentation associated with the provided training data (and/or a template) in accordance to the identified keywords. In some implementations, the system can input the output of other databases, systems and sensors to automatically create compliance documentation.

The system can provide a second set of documents (e.g., current compliance documentation) associated with the particular observed system asset, and identify a second set of gaps by comparing the first set of documents with the second set of documents. The second set of gaps can include documents present in the first set of documents and absent in the second set of documents, and/or documents present in the second set of documents and absent in the first set of documents. In some implementations, in response to identifying the second set of gaps, the system can automatically trigger execution of a set of corrective actions. The set of corrective actions can include, for example, adding the absent document within first set of documents to the second set of documents, modifying one or more documents in the second set of documents, removing one or more documents in the second set of documents, and/or adjusting at least one parameter of one or more AI models of at least one of the first set of AI models or the second set of AI models.

In operation 1814, using the identified set of gaps, the system can generate and/or automatically execute a set of actions to be performed related to the particular observed system asset configured to satisfy the set of criteria of the particular observed system asset. The set of actions can include isolating the particular observed system asset from a network of the particular observed system asset, logging information of the identified set of gaps (e.g., where the information includes a degree of satisfaction of the set of features of the particular observed system asset with the set of criteria of the particular observed system asset), and/or triggering one or more alarms in response to the degree of satisfaction falling below a predetermined threshold. In some implementations, the set of actions includes adding one or more criteria in the set of criteria absent from the set of features to the set of features. In some implementations, the system can use one or more AI models that uses the severity and impact of each gap, considering factors such as the criticality of the observed system asset, the potential risks associated with the gap, and/or the compliance requirements, to identify the set of actions. For example, if a database server storing PII is found to lack encryption, the decision-making engine can prioritize actions to immediately isolate the server and apply encryption measures.

To isolate the particular observed system asset from the network, the system can use network segmentation techniques to reconfigure network switches and routers to create a separate network segment for the asset, effectively isolating it from other parts of the network. The system can use software-defined networking (SDN) to dynamically adjust network configurations and enforce isolation policies. For example, the system can use SDN controllers to create virtual network segments and apply access control policies that restrict communication between the isolated asset and other network components. To log information of the identified set of gaps, the system can use centralized logging and monitoring systems such as Security Information and Event Management (SIEM) systems to collect and aggregate log data. The logs can include information about the degree of satisfaction of the set of features with the set of criteria, timestamps, and any actions taken to address the gaps.

In some implementations, identifying the set of gaps of the particular observed system asset can cause the system to monitor the particular observed system asset by, for example, detecting unauthorized access attempts to the particular observed system asset, identifying a set of anomalies in the data transmissions associated with the particular observed system asset, and/or generating alerts for the identified set of anomalies. The system can monitor each particular observed system asset of the set of observed system assets for deviations from the set of criteria of the particular observed system asset, in accordance with predetermined intervals. In response to detecting a set of deviations, the system can automatically update the set of gaps. Using the updated set of gaps, the system can generate a set of actions of the observed system assets configured to satisfy the set of criteria of the observed system assets. To trigger alarms in response to the degree of satisfaction falling below a predetermined threshold, the system can continuously monitor the compliance status of the observed system assets and generate alerts when gaps are detected. The alerts can be configured to notify relevant users, such as IT administrators, security teams, and compliance officers.

In some implementations, using the generated set of actions, the system can automatically trigger an automated workflow indicated by the generated set of actions. The automated workflow can include executing the generated set of actions. The system can, for example, use automation tools and scripts to apply configuration changes, install security patches, and update software settings. For example, if a server is found to lack encryption, the system can automatically deploy encryption software and configure it to secure the server's data. Automated remediation can help ensure that gaps are addressed quickly and consistently, reducing the risk of non-compliance and security breaches (and can be used to comply with regulations that mandate quick remediation). Additionally, the system can analyze historical data on identified gaps and the actions taken to address them to identify patterns and trends that indicate the most effective remediation strategies. For example, the models can learn that applying encryption measures immediately after isolating a server is more effective than applying them before isolation. In some implementations, the set of actions can include updating the set of criteria for the observed system assets.

In some implementations, for each particular observed model use case of the set of observed model use cases, the system can associate each particular observed system asset with a timestamp of the set of alphanumeric characters and when the particular observed system asset was determined. Further, using a third set of AI models (which can be the same as or different from the first and second set of AI models), the system can aggregate a set of documents associated with the particular observed system asset. The set of documents can satisfy the set of criteria corresponding to the associated information assets. The set of documents can include the associated timestamp. For each particular information asset of the set of information assets, the system can generate for display on the computing device, a layout indicating the aggregated set of documents. The layout can include a first representation of the particular information asset and a second representation of the corresponding documents in the aggregated set of documents.

For each particular observed system asset of the set of observed system assets, the system can assign each particular observed system asset a version indicating, for example, (i) the set of features of the particular observed system asset, (ii) a risk category of the set of criteria of the particular observed system asset, (iii) the set of criteria of the particular observed system asset, (iv) the set of gaps of the set of criteria of the particular observed system asset, (v) a corresponding set of alphanumeric characters of the set of criteria of the particular observed system asset, and/or (vi) an explanation of the set of parameters used by one or more AI models of the first set of AI models and/or the second set of AI models to generate one or more of: the associated informational assets, the set of criteria, or the set of gaps of the particular observed system asset. Methods of versioning are discussed in further detail with reference to versioning and/or appending timestamps onto one or more of the classifications of the observed model use cases, the set of alphanumeric characters, the operational data, and so forth, discussed with reference to FIG. 14.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system comprising:

at least one hardware processor; and at least one non-transitory memory storing instructions, which, when executed by the at least one hardware processor, cause the system to:

obtain an observed system asset set from operational data, wherein the operational data indicates one or more of: a software asset or a hardware asset used on an informational asset set within the operational data, and wherein each particular observed system asset of the observed system asset set is associated with a feature set;

associate each information asset in the information asset set indicated by one or more observed system assets of the observed system asset set with the one or more observed system assets;

for one or more particular observed system assets of the observed system asset set, using an AI model set to:

identify a criteria set of the particular observed system asset, and identify a gap set of the particular observed system asset by comparing the criteria set of the particular observed system asset with the feature set of the particular observed system asset;

cause transmission of, via an interface of a computing device, a representation that indicates one or more determined gap sets;

subsequent to an input received via the interface of the computing device, cause execution, via the computing device, of an action set to modify of one or more observed system assets based on the gap set; and cause transmission, via the computing device, of the modified one or more observed system assets of the observed system asset set into the AI model set to validate satisfaction of the criteria set of the one or more observed system assets.

2. The system of claim 1, wherein the operational data includes metadata associated with one or more of the software asset or the hardware asset, and wherein the metadata defines one or more of: a version number, a configuration setting, an operational log, or a performance metric.

3. The system of claim 1, wherein the system is further caused to:

apply one or more rules in accordance with a predefined criteria set to determine which information asset in the information asset set is indicated by the operational data.

4. The system of claim 1, wherein the system is further caused to:

record the action set in an execution store log configured to maintain the action set in persistent storage.

5. The system of claim 1, wherein the observed system asset set is categorized into one or more model use cases prior to obtaining the observed system asset set.

6. One or more non-transitory computer-readable storage media comprising instructions thereon, wherein the instructions when executed by at least one data processor of a system, cause the system to:

obtain an observed system asset set from operational data, wherein the operational data indicates one or more of: a software asset or a hardware asset used on an informational asset set within the operational data, and wherein each particular observed system asset of the observed system asset set is associated with a feature set;

for one or more particular observed system assets of the observed system asset set, using an AI model set to:

identify a criteria set of the particular observed system asset, and identify a gap set of the particular observed system asset by comparing the criteria set of the particular observed system asset with the feature set of the particular observed system asset;

cause transmission of a representation that indicates one or more determined gap sets to a computing device;

cause execution, via the computing device, of an action set to modify of one or more observed system assets based on the gap set; and cause transmission, via the computing device, of the modified one or more observed system assets of the observed system asset set into the AI model set to validate satisfaction of the criteria set of the one or more observed system assets.

7. The one or more non-transitory computer-readable storage media of claim 6, wherein the set of actions include adding one or more criteria in the set of criteria absent from the set of features to the set of features.

8. The one or more non-transitory computer-readable storage media of claim 6, wherein the instructions further cause the system to:

generate an audit report indicating one or more of: the observed system asset set, the criteria set, the gap set, or the action set, wherein the audit report is associated with a timestamp indicating when the audit report was generated.

9. The one or more non-transitory computer-readable storage media of claim 6, wherein one or more of the AI models in the AI model set is an AI agent.

10. The one or more non-transitory computer-readable storage media of claim 6, wherein the instructions further cause the system to:

automatically generate a new audit report at a predetermined interval.

11. The one or more non-transitory computer-readable storage media of claim 10, wherein the instructions further cause the system to:

using a graph-based model to represent one or more relationships between information assets and observed system assets, wherein one or more nodes of the graph-based model represent the observed system asset set, and wherein one or more edges of the graph-based model represent a relationship between the nodes.

12. The one or more non-transitory computer-readable storage media of claim 6, wherein the criteria set is identified by:

associating the particular observed system asset with a category; and mapping the category to the criteria set.

13. A computer-implemented method comprising:

obtaining an observed system asset set from operational data, wherein each particular observed system asset of the observed system asset set is associated with a feature set;

for one or more particular observed system assets of the observed system asset set, using an AI model set to:

identify a criteria set of the particular observed system asset, and determine a gap set of the particular observed system asset by comparing the criteria set of the particular observed system asset with the feature set of the particular observed system asset;

causing transmission, via a computing device, of a representation that indicates one or more determined gap sets;

subsequent to an input, causing modification, via the computing device, of one or more observed system assets based on the gap set; and causing transmission of the modified one or more observed system assets of the observed system asset set into the AI model set to validate satisfaction of the criteria set of the one or more observed system assets.

14. The computer-implemented method of claim 13, wherein the AI model set includes one or more agents.

15. The computer-implemented method of claim 13, further comprising:

assigning each particular observed system asset a unique identifier; and associating the unique identifier with an audit log entry.

16. The computer-implemented method of claim 13, further comprising:

determining an action set configured to execute the modification;

prior to execution of the action set, comparing each action in the action set against a database of permissible actions; and in response to determining that each action in the action set maps to one or more permissible actions in the database, causing execution of the action set.

17. The computer-implemented method of claim 13, further comprising:

generating, for each gap in the gap set, a corresponding explanation describing one or more criteria absent from the particular observed system asset.

18. The computer-implemented method of claim 13, further comprising:

using a graph-based model to represent one or more relationships between information assets and observed system assets.

19. The computer-implemented method of claim 13, further comprising:

adding one or more criteria in the set of criteria absent from the set of features to the set of features.

20. The computer-implemented method of claim 13, further comprising determining an action set configured to execute the modification;

recording the action set in an execution store log configured to maintain the action set in persistent storage.

* * * * *